(12) United States Patent
Ahmad et al.

(10) Patent No.: US 9,840,425 B2
(45) Date of Patent: Dec. 12, 2017

(54) PHOTO-REGENERABLE FILTERS USEFUL FOR THE REMOVAL OF ORGANIC COMPOUNDS

(71) Applicant: Khalifa University of Science and Technology, Abu Dhabi (AE)

(72) Inventors: Farrukh Ahmad, Carpentersville, IL (US); Qammer Zaib, Abu Dhabi (AE)

(73) Assignee: KHALIFA UNIVERSITY OF SCIENCE AND TECHNOLOGY, Abu Dhabi (AE)

(*) Notice: Subject to any disclaimer, the term of this patent is extended or adjusted under 35 U.S.C. 154(b) by 216 days.

(21) Appl. No.: 14/609,696

(22) Filed: Jan. 30, 2015

(65) Prior Publication Data

US 2015/0218013 A1    Aug. 6, 2015

Related U.S. Application Data

(60) Provisional application No. 61/934,314, filed on Jan. 31, 2014.

(51) Int. Cl.
| | |
|---|---|
| *C02F 1/28* | (2006.01) |
| *B01J 21/18* | (2006.01) |
| *B01J 21/06* | (2006.01) |
| *C02F 101/30* | (2006.01) |
| *B01J 35/06* | (2006.01) |

(Continued)

(52) U.S. Cl.
CPC .............. *C02F 1/288* (2013.01); *B01D 61/00* (2013.01); *B01J 20/205* (2013.01); *B01J 20/3295* (2013.01); *B01J 20/3441* (2013.01); *B01J 21/063* (2013.01); *B01J 21/185* (2013.01); *B01J 35/004* (2013.01); *B01J 35/065* (2013.01); *B01J 37/06* (2013.01); *B01J 37/10* (2013.01); *B01J 37/343* (2013.01); *C02F 2101/30* (2013.01); *C02F 2101/306* (2013.01); *C02F 2101/308* (2013.01); *C02F 2101/34* (2013.01); *C02F 2101/363* (2013.01); *C02F 2101/38* (2013.01);

(Continued)

(58) Field of Classification Search
None
See application file for complete search history.

(56) References Cited

U.S. PATENT DOCUMENTS

| 6,808,908 B2 | 10/2004 | Yao et al. |
| 2009/0175757 A1 | 7/2009 | Yao et al. |

(Continued)

OTHER PUBLICATIONS

Baughman RH et al. Carbon Nanotubes—the route toward applications. Science. Aug. 2, 2002; 297: 787-792.

(Continued)

*Primary Examiner* — Krishnan S Menon
(74) *Attorney, Agent, or Firm* — Myers Bigel, P.A.

(57) ABSTRACT

Provided herein is a composition comprising high surface area titanium dioxide nanospheres, as well as a process for making the same. Also provided is a composition comprising carbon nanotubes and high surface area titanium dioxide nanospheres, wherein said high surface area titanium dioxide nanospheres are dispersed in said carbon nanotubes. Further provided is a method for making a filter comprising carbon nanotubes, wherein said carbon nanotubes comprise high surface area titanium dioxide nanospheres dispersed therein, as well as filters so produced, and a method of photo-regenerating the filters.

17 Claims, 10 Drawing Sheets

(51) Int. Cl.
*B01D 61/00* (2006.01)
*B01J 20/32* (2006.01)
*B01J 20/34* (2006.01)
*B01J 20/20* (2006.01)
*B01J 35/00* (2006.01)
*B01J 37/06* (2006.01)
*B01J 37/10* (2006.01)
*C02F 101/34* (2006.01)
*C02F 101/38* (2006.01)
*C02F 101/36* (2006.01)
*B01J 37/34* (2006.01)

(52) U.S. Cl.
CPC ...... *C02F 2303/16* (2013.01); *C02F 2305/08* (2013.01); *C02F 2305/10* (2013.01)

(56) References Cited

U.S. PATENT DOCUMENTS

| | | |
|---|---|---|
| 2011/0194990 A1 | 8/2011 | Hsu et al. |
| 2013/0015122 A1* | 1/2013 | Awadh ................ B82Y 30/00 210/500.21 |
| 2013/0090405 A1 | 4/2013 | Elimelech et al. |

OTHER PUBLICATIONS

Benitez FJ et al. Comparison of different chemical oxidation treatments for the removal of selected pharmaceuticals in water matrices. Chemical Engineering Journal. 2011; 168: 1149-1156.

Blazkova A et al. Effect of light sources on the phenol degradation using Pt/TiO2 photocatalysts immobilized on glass fibres. Journal of Photochemistry and Photobiology A: Chemistry. 1998; 113: 251-256.

Joseph L et al. Removal of bisphenol A and 17α-ethinyl estradiol from landfill leachate using single-walled carbon nanotubes. Water Research. 2011; 45: 4056-4068.

Li B and Zhang T. Biodegradation and adsorption of antibiotics in the activated sludge process. Environmental Science & Technology. 2010; 44(9): 3468-3473.

Martinez C et al. Kinetics and mechanisms of aqueous degradation of carbamazepine by heterogeneous photocatalysis using nanocrystalline TiO2, ZnO and multi-walled carbon nanotubes-anatase composites. Applied Catalysis B: Environmental. 2011: 102: 563-571.

Oleszczuk P et al. Adsorption and desorption of oxytetracycline and carbamazepine by multiwalled carbon nanotubes. Environmental Science & Technology. 2009; 43(24): 9167-9173.

Poudel B et al. Formation of crystallized titania nanotubes and their transformation into nanowires. Nanotechnology. 2005; 16: 1935-1940.

Rahaman MS et al. Electrochemical carbon-nanotube filter performance toward virus removal and inactivation in the presence of natural organic matter. Environmental Science & Technology. 2012; 46: 1556-1564.

Saleh NB et al. Aggregation kinetics of multiwalled carbon nanotubes in aquatic systems: measurements and environmental implications. Environmental Science & Technology. 2008; 42: 7963-7969.

Smajda R et al. Structure and gas permeability of multi-wall carbon nanotube buckypapers. Carbon. 2007; 45(6): 1176-1184.

Wang H et al. Solar photocatalytic degradation of 2,6-dinitro-p-cresol (DNPC) using multi-walled carbon nanotubes (MWCNTs)-TiO2 composite photocatalysts. Chemosphere. 2009; 75: 1105-1111.

Wu Z et al. Transparent, conductive carbon nanotube films. Science. Aug. 27, 2004; 305: 1273-1276.

Yan XM et al. Adsorption and desorption of atrazine on carbon nanotubes. Journal of Colloid and Interface Science. 2008; 321: 30-38.

Yang K et al. Adsorption of polycyclic aromatic hydrocarbons by carbon nanomaterials. Environmental Science & Technology. 2006; 40(6): 1855-1861.

Yao Y et al. Photoreactive TiO2/carbon nanotube composites: synthesis and reactivity. Environmental Science & Technology. 2008; 42(13): 4952-4957.

Zaib Q et al. Removal of bisphenol A and 17β-estradiol by single-walled carbon nanotubes in aqueous solution: adsorption and molecular modeling. Water Air Soil Pollut. 2012; 223: 3281-3293.

Zaib Q et al. Ultrasonication study for suspending single-walled carbon nanotubes in water. J Nanosci Nanotechnol. May 2012; 12(5): 3909-17, Abstract only.

Zaib Q et al. Photo-regenerable multi-walled carbon nanotube membranes for the removal of pharmaceutical micropollutants from water. Environmental Science: Processes & Impacts. 2013. DOI: 10.1039/c3em00150d. Electronic Supplementary Information (ESI), 5 pp.

Zhang Y et al. TiO2-graphene nanocomposites for gas-phase photocatalytic degradation of volatile aromatic pollutant: is TiO2-graphene truly different from other TiO2-carbon composite materials? ACS Nano. 2010; 4(12): 7303-7314.

* cited by examiner

FIG. 8
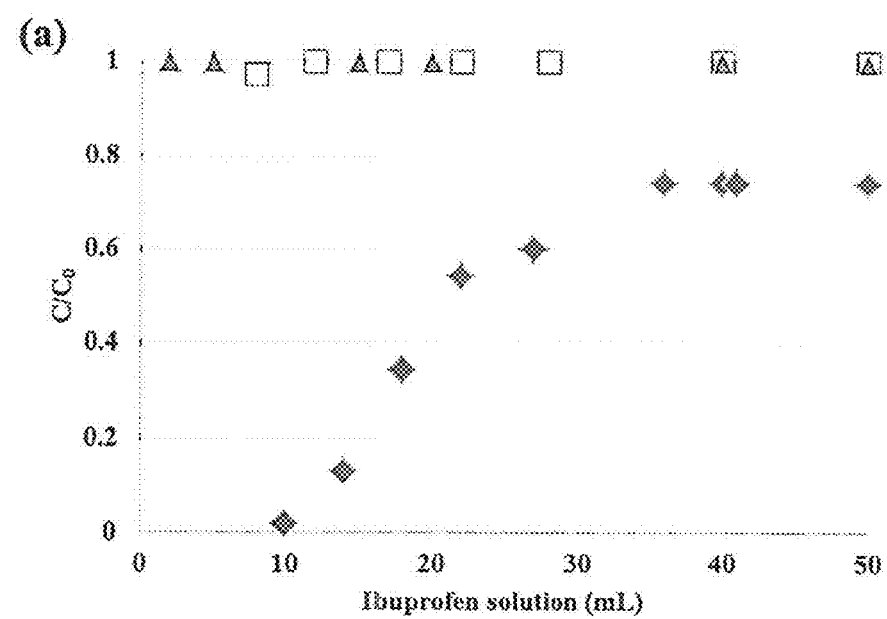
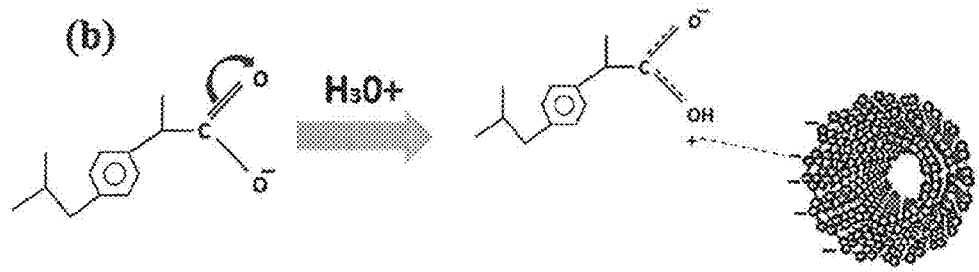

PHOTO-REGENERABLE FILTERS USEFUL FOR THE REMOVAL OF ORGANIC COMPOUNDS

BRIEF SUMMARY

Pharmaceuticals are emerging contaminants because of their frequent occurrence in surface water, groundwater, seawater, and treated sewage effluent. The production of oral and intravenous pharmaceutical compounds for use in veterinary and human medicines is increasing globally due to aging populations and enhancement in the quality of life. Pharmaceuticals usually enter the environment either through excretion from humans and animals, or through direct disposal of unused or expired medicines in wastewater Provided herein is a process for making a composition including high surface area titanium dioxide nanospheres dendrites. In some embodiments, the process may include one or more of the steps of: a) providing a suspension comprising titanium dioxide, anatase, in an aqueous base; b) autoclaving the suspension for a time of from 6 to 30 hours, at a temperature of from 80° C. to 160° C., to provide an autoclaved titanium dioxide; c) separating the autoclaved titanium dioxide from the aqueous base; d) adding to the autoclaved titanium dioxide an aqueous acid to form a second suspension having an aqueous layer; e) decanting the aqueous layer and measuring the pH of the aqueous layer; f) repeating steps d) and e) until the aqueous layer has a pH of about 6.5 to about 7.5, to thereby make said composition comprising high surface area titanium dioxide nanospheres. In some embodiments, the process also includes washing the high surface area titanium dioxide nanospheres with a suitable solvent until the conductivity value is less than about 1 µS/cm.

Also provided is a composition comprising high surface area titanium dioxide nanospheres dendrites produced by a process as taught herein. In some embodiments, the high surface area titanium dioxide nanospheres have an average diameter of from about 50 to about 1000 nanometers.

Further provided is a composition comprising carbon nanotubes and high surface area titanium dioxide nanospheres, wherein said high surface area titanium dioxide nanospheres are dispersed in said carbon nanotubes. In some embodiments, the carbon nanotubes are multi-walled carbon nanotubes.

Still further provided is a method for making a filter comprising carbon nanotubes, wherein said carbon nanotubes comprise high surface area titanium dioxide nanospheres dispersed therein, which method may include one or more of the steps of: (a) providing a vacuum filtration apparatus and placing a porous substrate into said vacuum filtration apparatus; (b) adding a composition comprising carbon nanotubes and a surfactant; (c) applying negative pressure to draw said composition through said porous substrate, thereby adsorbing said carbon nanotubes onto said porous substrate; (d) washing said porous substrate with a solvent; (e) adding a suspension comprising high surface area titanium dioxide nanospheres; (f) applying negative pressure to draw said titanium dioxide suspension through said porous substrate comprising said carbon nanotubes, to thereby adsorb the titanium dioxide onto said carbon nanotubes, to make said filter. In some embodiments, the method may further include washing the composition with a solvent until the conductivity of the solvent passed through said composition is less than about 1 µS/cm. In other embodiments, the 30±20 µm thick membrane was used for an permeate flux range from 10 to 50 L/m²·h.

In some embodiments, the porous substratum comprises single or multi-component polymers comprising acrylics, co-polyesters, nylons, polycarbonates, polyesters, polyimides, polyolefins such as polyethylene, polypropylene, halogenated polymers such as polyvinylchloride (PVC), polytetrafluoroethylene (Teflon) and polyvinylidene difluoride (PVDF), polyarylsulfones, polyethersulfones, polyphenylsulfones, polysulfones, polyvinyl alcohols, celluloses, mixed esters of cellulose (MEC), polystyrenes, polyurethanes, surface modified polyethersulfone (PES), PFA, or rubbers selected from the group consisting of silicone, natural, synthetic and vulcanized.

In some embodiments, the porous substrate has an average pore size of about 100 to about 300 nm.

Also provided is a filter comprising: a porous substrate; and a layer of carbon nanotubes on said porous substrate, wherein said carbon nanotubes comprise high surface area titanium dioxide nanospheres surficially dispersed therein. In some embodiments, the carbon nanotubes comprise multi-walled carbon nanotubes. In some embodiments, the filter is photoregenerable.

Further provided is a method for removing a substance from water, comprising: providing a filter as taught herein; and passing a composition comprising said substance in the water through said filter, wherein said water is in fluid contact with the carbon nanotubes comprise high surface area titanium dioxide nanospheres dispersed therein; whereby said substance is adsorbed onto the of the carbon nanotubes of the filter; to remove the substance from the water. The regeneration of the carbon nanotubes was performed by the photoactivation of the dispersed titanium dioxide nanospheres that acts to breakdown the substance and release it from the carbon nanotubes.

In some embodiments, the substance comprises a nonpolar or slightly polar organic compound. In some embodiments, the substance is a polycyclic aromatic hydrocarbon, polychlorinated biphenyl (PCB), phthalate, surfactant, dioxin, furan, organic compound originating from food and household related product, plasticizer, flame retardant, preservative, antioxidant, chlorinated and non-chlorinated solvent, fragrance, insecticide, pesticide, fungicide, herbicide, pharmaceutical, organic pollutant from road or vehicle pollution, dye, or an iodinated X-ray contrast substance. In some embodiments, the substance is a pharmaceutical.

Still further provided is a method for photo-regenerating a filter as taught herein, comprising: solvation of the filter and applying ultraviolet light to said filter for about 1 to about 8 hours, to thereby regenerate said filter.

BRIEF DESCRIPTION OF THE DRAWINGS

FIG. 8: (a) Adsorption of ibuprofen on the MWNT membrane at different pHs.

DETAILED DESCRIPTION OF EMBODIMENTS

Figure 1:
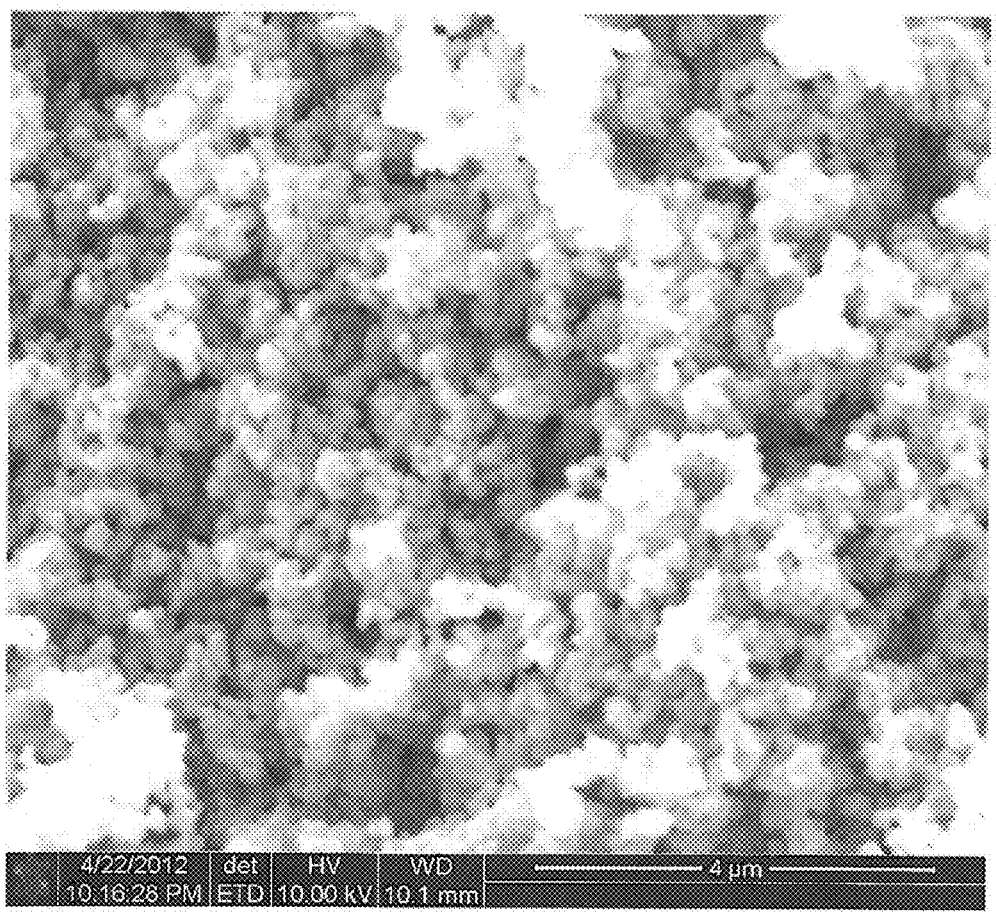
FIG. 1: SEM micrograph of AnataseTiO$_2$ before hydrothermal treatment.

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

The term "about" as used herein when referring to a measurable value such as an amount or concentration (e.g., salinity) and the like, is meant to be variations of up to ±20%, ±10%, ±5%, ±1%, ±0.5%, or even ±0.1% of the specified amount or value.

The term "consist essentially of", as used herein in reference to a compound or composition, is meant that at least 80, 90, 95 or 99 percent is made up of such compound or composition by weight or by volume.

The term "between" as used herein when referencing a range of values is meant to include the end points as well as any particular value in said range, unless the context indicates otherwise.

All publications, patent applications, patents, patent publications, and other references cited herein are incorporated by reference in their entireties to the extent they are consistent with the description presented herein.

"Absorb" or "absorption" refers to the taking in or soaking up of a substance by chemical or physical action, typically through pores or interstices.

An "acid" is a compound that can act as a proton donor or electron pair acceptor, and thus can react with a base. The strength of an acid corresponds to its ability or tendency to lose a proton. A "strong acid" is one that completely dissociates in water. Examples of strong acids include, but are not limited to, hydrochloric acid (HCl), hydroiodic acid (HI), hydrobromic acid (HBr), perchloric acid (HClO$_4$), nitric acid (HNO$_3$), sulfuric acid (H$_2$SO$_4$), etc. A "weak" or "mild" acid, by contrast, only partially dissociates, with both the acid and the conjugate base in solution at equilibrium. Examples of mild acids include, but are not limited to, carboxylic acids such as acetic acid, citric acid, formic acid, gluconic acid, lactic acid, oxalic acid, tartaric acid, ethylenediaminetetraacetic acid (EDTA), etc.

"Adsorb" or "Adsorption" refers to the adhesion or otherwise holding of a thin layer of a substance (molecules of a gas, solute, or liquid) onto a surface (outside surface or internal surface) of another solid or liquid substance with which they are in contact. For example, compounds that contain chromogenic groups (atomic arrangements that vibrate at frequencies in the visible spectrum) may be adsorbed onto activated carbon. Common industrial adsorbents include, but are not limited to, activated carbon, silica gel and alumina.

"Anatase" refers to a naturally-occurring crystalline form of titanium dioxide, TiO$_2$.

"Aqueous" refers to a solution in which water is the dissolving medium, or solvent. An "aqueous base" is a base in water. An "aqueous acid" is an acid in water.

"Autoclave" refers to the use of pressurized steam to subject items or contents to temperatures at about 100-150 degrees Celsius for a period of time (e.g., 5, 10, 20, 25, 30 minutes), typically for sterilization. It also may refer to a machine in which such process may be performed.

A "base" is a compound that can accept a proton (hydrogen ion) or donate an electron pair. A base can be organic or inorganic (e.g., DBU, cesium carbonate, etc.). A "strong base" as used herein is a compound that is capable of deprotonating very weak acids. Examples of strong bases include, but are not limited to, hydroxides, alkoxides, and ammonia.

"Compound" refers to a substance formed when two or more chemical elements are chemically bonded together. Two types of chemical bonds common in compounds are covalent bonds and ionic bonds. The elements in any compound are always present in fixed ratios. As an example, pure water is a compound made from two elements—hydrogen and oxygen. The ratio of hydrogen to oxygen in water is always 2:1. Each molecule of water contains two hydrogen atoms bonded to a single oxygen atom. As a second example, pure methane is a compound made from two elements—carbon and hydrogen. The ratio of hydrogen to carbon in methane is always 4:1. As a third example, pure table salt (sodium chloride) is a compound made from two elements—sodium and chlorine. The ratio of sodium ions to chloride ions in sodium chloride is always 1:1. Compounds can be decomposed chemically into their constituent elements.

"Decantation" or "decanting", as used herein, refers to the process whereby a liquid is poured off without disturbing the sediment or solids.

"Filter" as used herein refers to a material useful for fluid filtration.

"Filtration" is the mechanical or physical separation of solids from fluids (liquids or gas) by interposing a medium through which the fluid may more freely pass than the solids.

A "hydroxide" is the commonly known diatomic anion OH⁻, or a salt thereof (typically an alkali metal or alkaline earth metal salt thereof). Examples of hydroxides include, but are not limited to, sodium hydroxide (NaOH), potassium hydroxide (KOH), lithium hydroxide (LiOH), and calcium hydroxide ($Ca(OH)_2$).

"Pharmaceutical" refers to a compound manufactured for use as a medicinal drug. Compounds typically have a molecular weight ranging from at least about 100 g/mol.

"Photo-regeneration", as used herein, refers to the process whereby a filter is cleaned e.g., adsorbed compounds are removed, upon the application of photons, e.g., by exposure to ultraviolet light. A filter is "photoregenerable" when it still maintains at least some of its adsorption and/or filtration properties after the photo-regeneration. In some embodiments, photoregeneration of filters containing $TiO_2$ may include a process by which the $TiO_2$ catalyzes the formation of hydroxy radicals from water, which may then aid in decomposing an adsorbed organic pollutant.

"Reflux" or "refluxing" as used herein, refers to a technique in which vapors from a boiling liquid are condensed and returned to the mixture from which it came, typically by boiling the liquid in a vessel attached to a condenser.

"Surfactant" or "surface-active agent" refers to a substance that, when dissolved in water, lowers the surface tension of the water and increases the solubility of organic compounds. Surfactants are usually organic compounds that are amphipathic (comprising a hydrophilic group (head) and hydrophobic group (tail)). Therefore, they are soluble in both organic solvents and water. Anionic surfactants give rise to a negatively-charged surfactant ion and a positively charged counterion upon dissolution in water. Examples of anionic surfactants include, but are not limited to, sulfonic acid salts, alcohol sulfates such as sodium dodecyl sulfate and sodium octyl sulfate, alkylbenzene sulfonates, such as sodium dodecylbenzenesulfonate, phosphoric acid esters, and carboxylic acid salts. Non-ionic, cationic, and amphoteric/zwitterionic surfactants are also known.

"Suspension" refers to a heterogeneous solution comprising solid particles in a liquid.

"Washing" refers to a purification process whereby a solid is contacted with a liquid and the liquid is subsequently removed. In theory, the liquid that is used in the washing process is selected to remove impurities from the solid. As an example, a compound may be suspended in a liquid, centrifuged, and the liquid removed from the compound by decanting.

Titanium Dioxide

Titanium dioxide or titanium (IV) oxide exits naturally in one of three crystalline forms. The first crystalline form is anatase (CAS no. 1317-70-0), the second crystalline form is rutile (CAS no. 1317-80-2) and the third is brookite (CAS no. 1218841-41-9). Rutile is the thermodynamically stable form of titanium dioxide, and anatase is known to rapidly transform to rutile above 700° C. Typically, titanium dioxide in the anatase form is produced as a white powder. Titanium dioxide is insoluble in dilute sulfuric acid, hydrochloric acid, organic solvents and water. Titanium dioxide is reportedly almost insoluble in aqueous alkali media.

Process for Preparing Titanium Dioxide High Surface Area Nanospheres and Nanoclusters "Titanium dioxide nanorods" or "nanorods" refer to titanium dioxide having a rod shape at the nanometer scale. The rods can have lengths ranging from about 20 nm to about 2,000 nm. Nanorods typically have widths of about 1 to about 100 nm and aspect ratios greater than 1 but less than 20. The aspect ratio of a shape is defined as the length of the major axis divided by the width of the minor axis.

"Titanium dioxide nanospheres" as used herein, refer to spheres of titanium dioxide on the nanometer scale having an average diameter of from 50, 70, 100, 125, or 150 nm, to 800, 900, or 1,000 nm, inclusive of surface features. In some embodiments, the nanospheres have a "high surface area" such as those taught herein which are processed to form needle-like structures on their surfaces. Needle-like structures are also referred to as dendrites that are able to more readily adhere to carbon nanotube coated filters. In some embodiments, nanospheres clump together to form "nanoclusters" of titanium dioxide nanospheres.

In some embodiments, titanium dioxide high surface area nanospheres and nanoclusters can be obtained from titanium dioxide, anatase. In an exemplary process, titanium dioxide, anatase, is suspended in an aqueous base and stirred at a temperature ranging from about 10° C. to about 50° C. for a period of time ranging from about 30 minutes to about 12 hours.

In some embodiments, the aqueous base comprises water and a strong base (e.g., a hydroxide). In some embodiments, the aqueous base has a concentration of from about 8 M to about 12 M. In some embodiments, the aqueous base has a concentration of about 10 M. In some embodiments, the aqueous base is aqueous sodium hydroxide at a concentration of about 10 M.

In some embodiments, the titanium dioxide suspension is cooled to ambient temperature, transferred to, and autoclaved at a temperature ranging from about 80° C. to about 160° C. for a period of time ranging from about 12 to about 24 hours. In some embodiments, the autoclaving occurs at a temperature of about 120° C. for about 18 hours. In some embodiments, the suspension is cooled to ambient temperature, centrifuged and the aqueous base removed by decanting. In some embodiments, the suspension is centrifuged at about 2,000 to about 10,000 rpm for a time period of about 0.25 hours to about 2 hours. In some embodiments, the suspension is centrifuged at about 2,000 to about 5,000 rpm for a period of about 0.25 hours to about 2 hours.

In some embodiments, the titanium dioxide high surface area nanospheres and nanoclusters produced from the autoclaving process are diluted with an aqueous acid. In some embodiments, the aqueous acid is a strong acid (e.g., hydrobromic, hydrochloric, hydroiodic, nitric, perchloric and/or sulfuric acid). In some embodiments, the aqueous acid is hydrochloric acid. In some embodiments, the aqueous acid has a concentration of about 0.5 to about 1.5 M. In some embodiments, the aqueous acid has a concentration of about 1 M.

In some embodiments, the aqueous acid suspension is heated at reflux for a period of time ranging from about 1 to about 8 hours. In some embodiments, the aqueous acid suspension is heated at reflux for a period of time of about 4 hours. In some embodiments, the suspension is cooled to ambient temperature and the aqueous acid is removed by decanting. In some embodiments, the titanium dioxide high surface area nanospheres and nanoclusters are then suspended in deionized water, the suspension optionally centrifuged and the water decanted off. In some embodiments, the suspension is centrifuged at about 2,000 to about 10,000×g for a period of about 0.25 hours to about 2 hours. In some embodiments, the suspension is centrifuged at about 2,000 to about 5,000×g for a period of about 0.25 hours to about 2 hours. In some embodiments, the titanium dioxide high surface area nanospheres and nanoclusters are suspended in deionized water, optionally centrifuged and the water decanted off. The washing process may be repeated until the conductivity value is constant.

In some embodiments, the aforementioned process produces titanium dioxide high surface area nanospheres having an average diameter of from 50, 70, 100, 125, or 150 nm, to 800, 900, or 1,000 nm, inclusive of surface features. In some embodiments, the titanium dioxide high surface area nanospheres are suspended in deionized water to obtain a concentration of 1 mg of titanium dioxide high surface area nanospheres per 1 mL deionized water.

Carbon Nanotubes

"Nanotubes" as used herein refer to cylindrical tubular structures that are well known in the art and commercially available. Nanotubes have been produced from a variety of elements including, but not limited to, boron and carbon.

"Carbon nanotube(s)" as used herein refer to nanoscale tubular structure(s) composed of six-membered rings of carbon whose bonding patterns create a hexagonal lattice which closes upon itself to form the walls of the cylindrical structure. Carbon nanotubes are typically polymers of pure carbon and can exist as either single-wall or multi-walled structures.

A "single-wall carbon nanotube" as used herein refers to a single graphene sheet rolled into a seamless cylinder with either open or closed ends. When the single-wall carbon nanotubes are closed, the ends are typically capped by half fullerenes or by more complex structures. The average diameter of a single-wall carbon nanotube ranges from about 0.6 nm to about 100 nm. The length to diameter ratio typically ranges from about 25 to about 1,000,000. A nanotube of 1 nm diameter can have a length of from about 100 nm to about 10.000 nm or more. In some instances, nanotubes can be about 10 nm in length, such as, for example, when they have been degraded by sonication of other processes. Nanotubes frequently exist as ropes which are bundles of three to five hundred single-walled nanotubes held together along their lengths by van der Waals forces. Individual nanotubes can branch off from a rope to join nanotubes of other ropes.

"Multi-walled carbon nanotubes", as used herein, comprise two or more concentric cylinders of graphene sheets of successfully larger diameter that form a layered composite tube that is held together by van der Waals forces. The concentric cylinders typically have a distance of about 0.34 nm between their layers.

In some embodiments, carbon nanotubes have inner diameters ranging from about 0.4 to 200 nm. In some embodiments, carbon nanotubes have outer diameters ranging from about 0.4 to 200 nm. In some embodiments, carbon nanotubes have average lengths from about 1 μm to about 50 μm, from about 1 μm to about 40 μm, from about 1 μm to about 30 μm, from about 10 μm to about 30 μm, or about 10 μm to about 20 μm.

In some embodiments, the average length of the multi-walled carbon nanotubes is between about 1 μm and about 50 μm, about 1 μm and about 40 μm, about 1 μm and about 30 μm, about 10 μm and about 30 μm, or about 10 μm and about 20 μm.

In some embodiments, the average inner diameter of the multi-walled carbon nanotubes is between about 1 μm and about 10 nm, about 2 nm and about 5 nm, about 3 nm and about 5 nm or about 5 nm and about 10 nm.

In some embodiments, the average outer diameter of the multi-walled carbon nanotubes is between about 5 nm and about 50 nm, or about 5 nm and about 30 nm.

Carbon nanotubes can exist in a variety of morphologies, including, but not limited to, bamboo cylindrical, dendrites, horns, nanotube Y-junctions, spider nanotube structures, spirals, springs, and tree morphology. See, WO 2010/126686, which is hereby incorporated by reference herein.

The carbon nanotubes described herein may be physically modified to alter their properties. In some embodiments, multi-walled carbon nanotubes are suspended in water, diluted with a surfactant, and adsorbed onto a porous substrate. In some embodiments, multi-walled carbon nanotubes are modified such that they comprise inorganic compounds adsorbed to the surface of the multi-walled carbon nanotubes. In some embodiments, multi-walled carbon nanotubes are modified by the inclusion of titanium dioxide high surface area nanospheres and nanoclusters. For example, multi-walled carbon nanotubes may further comprise titanium dioxide high surface area nanospheres and/or nanoclusters dispersed therein, e.g., by adsorption onto the multi-walled carbon nanotubes.

In some embodiments, a process of making a filter as described herein comprises adsorbing multi-walled carbon nanotubes onto a porous substrate. In some embodiments, multi-walled carbon nanotubes are suspended in water and diluted with a surfactant. In some embodiments, the multi-walled carbon nanotube and surfactant suspension are drawn through a filter to adsorb the multi-walled carbon nanotubes onto a porous substrate. In some embodiments, a process of adsorbing titanium dioxide onto multi-walled carbon nanotubes is disclosed. In some embodiments a multi-walled carbon nanotube and surfactant suspension are drawn through a filter to adsorb the multi-walled carbon nanotubes onto a porous substrate whereby titanium dioxide is then adsorbed onto the multi-walled carbon nanotubes. In some embodiments, the aforementioned filter is utilized to remove constituents from a fluid. In some embodiments, the constituents comprise pharmaceuticals. In some embodiments, the filter can be photo-regenerated through hydration followed by the use of an ultraviolet light source.

Porous Substrates

"Porous substrate(s)", as used herein, refers to a material that comprises a plurality of pores that can be used as a filter. The porous substrates in this application are permeable to the flow of a fluid, including a liquid fluid such as water.

In some embodiments, the porous substrate comprises a plurality of pores which have diameters between about 50 nm to about 1000 nm, about 50 nm to about 750 nm, about 50 nm to about 500 nm, about 50 nm to about 300 nm, about 150 nm to about 250 nm or about 220 nm.

In some embodiments, a filter described herein comprises a porous substrate on which carbon nanotubes are adsorbed. The porous substrates can establish the overall dimensions (i.e., length, width and thickness) of the filter as well as the shape of the filters as they are being formed. The porous substrate can also provide the finished membrane with structural stability. The porous support substrate may be in any form suitable for the shape of the resulting filter, such as, for example, a block, tube (or cylinder), sheet or roll, and may comprise a material chosen from ceramic, carbon, metal, metal alloys, or plastic or a combination thereof.

In some embodiments, the porous substrate comprises a woven or non-woven fibrous material. In some embodiments, the porous substrate comprises a polymer. In some embodiments, the polymeric material of the porous substrate comprises single or multi-component polymers including, but not limited to, acrylics, co-polyesters, nylons, polycarbonates, polyesters, polyimides, polyolefins such as polyethylene, polypropylene, halogenated polymers such as polyvinylchloride (PVC), polytetrafluoroethylene (Teflon) and polyvinylidene difluoride (PVDF), polyarylsulfones, polyethersulfones, polyphenylsulfones, polysulfones, polyvinyl alcohols, celluloses, mixed esters of cellulose (MEC), polystyrenes, polyurethanes, surface modified polyethersulfone (PES), PFA, rubbers including, but not limited to, silicone, natural, synthetic and vulcanized. See, U.S. Pat. No. 8,591,745 to Merino et al. column 4, which is incorporated herein by reference. In some embodiments, the porous substrate comprises nitrocellulose. Other suitable types of porous substrates will be apparent to those of skill in the art and are to be considered within the scope of the present invention.

While the porous substrate can serve a filtering function by size exclusion, in some embodiments its filtering characteristics, if any, will be insignificant due to its microporous nature, when compared to the nanotubes in the filter. Considering this, the molecular weight of the single or multi-component polymers of the substrate can significantly vary. In some embodiments, it will be convenient to use a support with a molecular weight cutoff of from about 1 kDa to about 10 MDa, or from about 5 kDa to about 300 kDa. In some embodiments the porous substrate comprises a plurality of pores ranging in average diameter from about 50 nm to 1000 nm, about 50 nm to about 750 nm, about 50 nm to about 500 nm, about 50 nm to about 300 nm, about 150 nm to about 250 nm or about 220 nm.

The dimensions of the porous substrate will generally be selected to meet the needs of the particular application. These needs include the area through which the fluids will pass when the filter is used in purification, filtration, or other treatment of the fluids, as well as the pressure differential that will be imposed across the combined support and membrane during use. In some embodiments, the substrates are capable of withstanding pressure differentials of from about 1 atmosphere to about 85 atmospheres without rupturing.

In some embodiments, the porous substrate is in the form of a flat disk. In some embodiments, disks of a relatively small size are used and have a diameter range of from about 10 mm to about 100 mm. Diameters ranging from 13 mm to 47 mm, specifically disks of 13 mm, 25 mm, and 47 mm, may also be used. For disks of diameters between 10 mm and 100 mm, the disk thickness may range from about 5 μm to about 200 μm. In some embodiments, discs of diameters larger that about 100 mm may be used, such as, for example, discs between about 100 mm and about 1000 mm. Likewise, the thickness of the discs can also vary and in some embodiments, for example, the thickness is between about 5 μm to about 200 μm.

In some embodiments, the porous substrate can also be prepared in the form of rectangular sheets having widths ranging from 1 inch (2.5 cm) to 40 inches (102 cm). Widths of 9.75 inches (24.8 cm), 10 inches (25.4 cm), 20 inches (51 cm), and 40 inches (102 cm) may be used. The lengths of the sheets may range from about four inches (ten cm) to about 400 feet (122 m). For a sheet of these lateral dimensions, the sheet thickness may range from about 0.1 nm to about 1 mm.

In general, the thickness of the support is of less importance than the overall dimensions of the nanotubes, since the support need only be thick enough to provide structural support for the nanotubes.

Selected Filters

One aspect of the invention relates to a filter comprising a layer of carbon nanotubes dispersed on a porous substrate, wherein the carbon nanotubes comprise titanium dioxide high surface area nanospheres and nanoclusters, wherein the filter is permeable to the flow of a fluid.

The present inventors have discovered that titanium dioxide high surface area nanospheres and nanoclusters prepared as taught herein easily grafts/binds/entangles onto the carbon nanotube surface of a filter, thereby giving the very thermally and chemically stable carbon sorbent bed (e.g., MWNTs) photoregenerability through the binding of the photocatalyst to form this new composite. Without wishing to be bound by theory, there are most likely physical interactions that tangle up and keep the $TiO_2$ in place. Untreated $TiO_2$ taken through all the same steps as the ones treated to form titanium dioxide high surface area nanospheres and nanoclusters do not show the same interactions and to not stay on the carbon nanotube layer. It was found that untreated titanium dioxide nanospheres without the dendrite or needle-like projections had significantly reduced adherence or penetration to the MWNTs membrane and readily washed away from the carbon sorbent bed. For example, the untreated titanium dioxide will wash away when the membrane is submerged in water during UV regeneration. By contrast, the filter comprising a layer of carbon nanotubes dispersed on a porous substrate, wherein the carbon nanotubes comprise titanium dioxide high surface area nanospheres and nanoclusters, is chemically stable during a process of photoregeneration ("photoregenerable").

In some embodiments, the filter has a thickness which is between about 5 μm to about 200 μm. In some embodiments, the filter has a thickness which is between about 5 μm and about 150 μm.

In some embodiments, the thickness of the layer of carbon nanotubes is between about 0.1 μm and about 500 μm, or about 1 μm and about 10 μm.

In some embodiments, the application relates to any one of the aforementioned filters, wherein the loading of multi-walled carbon nanotubes is between about 0.0001 $mg/cm^2$ and about 100 $mg/cm^2$, about 0.0001 $mg/cm^2$ and about 50 $mg/cm^2$, about 0.0001 $mg/cm^2$ and about 10 $mg/cm^2$, or about 0.0001 $mg/cm^2$ and about 5 $mg/cm^2$. In some embodiments, the application relates to any one of the aforementioned filters, wherein the loading of multi-walled carbon nanotubes is between about 0.001 $mg/cm^2$ and about 1 $mg/cm^2$. In some embodiments, the application relates to any one of the aforementioned filters, wherein the loading of multi-walled carbon nanotubes is between about 0.001 $mg/cm^2$ and about 0.80 $mg/cm^2$. In some embodiments, the application relates to any one of the aforementioned filters, wherein the loading of multi-walled carbon nanotubes is about 0.001 $mg/cm^2$, about 0.05 $mg/cm^2$, about 0.01 $mg/cm^2$, about 0.02 $mg/cm^2$, about 0.05 $mg/cm^2$, or about 1 $mg/cm^2$.

In some embodiments, the application relates to any one of the aforementioned filters, wherein a majority of the carbon nanotubes are open at both ends. In some embodiments, the application relates to any one of the aforementioned filters, wherein a majority of the carbon nanotubes are closed at one end.

In some embodiments, related to any of the aforementioned filters, the fluid comprises at least one liquid. In some embodiments, related to any of the aforementioned filters, the fluid comprises water. In some embodiments, related to any of the aforementioned filters, the fluid is water such as ocean water, rain water, river water, human or animal wastewater, industrial wastewater, and/or well water.

In some embodiments, the application relates to any one of the aforementioned filters, wherein the fluid has a pH of between about 3 and about 13. In some embodiments, the application relates to any one of the aforementioned filters, wherein the fluid has a pH of between about 3 and about 11.

In some embodiments, the application relates to any one of the aforementioned filters, wherein the fluid has a pH of less than 4. In some embodiments, the application relates to any one of the aforementioned filters, wherein the fluid has a pH of about 7. In some embodiments, the application relates to any one of the aforementioned filters, wherein the fluid has a pH of about 11.

In some embodiments, the application relates to any one of the aforementioned filters, wherein the multi-walled carbon nanotubes and titanium dioxide high surface area nanospheres and nanoclusters are present in said filter in an amount sufficient to reduce the concentration of pharmaceuticals in the fluid that comes into contact with said filter.

In some embodiments, the application relates to any one of the aforementioned filters, wherein the fluid comprises one or more pharmaceuticals selected from the group consisting of acetaminophen, carbamazepine and ibuprofen.

In some embodiments, the application relates to any one of the aforementioned filters, wherein the filter provides a water permeability of at least 0.01 ml/s-cm$^2$-atm. In some embodiments, the application relates to any one of the aforementioned filters, wherein the filter provides a water permeability of between about 0.01 ml/s-cm$^2$-atm and about 100 ml/s-cm$^2$-atm.

In some embodiments, the application relates to any one of the aforementioned filters, wherein the filter provides a flux of at least 5 L/m$^2$·h. In some embodiments, the application relates to any one of the aforementioned filters, wherein the filter provides a flux of between about 10 L/m$^2$·h and about 50 L/m$^2$·h.

In some embodiments, the application relates to any one of the aforementioned filters, further comprising non-carbon containing nanotubes (such as, for example, bismuth nanotubes, boron nitride nanotubes, copper nanotubes, molybdenum dioxide nanotubes, silicon nanotubes, or tungsten disulfide nanotubes). In some embodiments, the non-carbon containing nanotubes are incorporated into the multi-walled carbon nanotube layer. In some embodiments, the non-carbon nanotubes are in their own layers.

Methods for Filter Manufacture

Several methods can be utilized to manufacture the filters described herein. For example, a filter can be manufactured by vacuum adsorption of multi-walled carbon nanotubes on at least one porous substrate. Ultrasonication can be used to facilitate multi-walled carbon nanotube dispersion prior to or during adsorption. In addition, a surfactant can be used to facilitate multi-walled carbon nanotube dispersion prior to or during adsorption.

In some embodiments, the adsorption process comprises suspending multi-walled carbon nanotubes in a suitable liquid and ultrasonicating to disperse the multi-walled carbon nanotubes (MWNTs). In some embodiments, water is used as the liquid to suspend the MWNTs.

In some embodiments, the adsorption process comprises placing multi-walled carbon nanotubes in a suitable liquid with a surfactant and ultrasonicating to disperse the multi-walled carbon nanotubes. Examples of anionic surfactants include, but are not limited to, sulfates, sulfonates, phosphates and carboxylates. Examples of anionic surfactant sulfates include, but are not limited to, sodium dodecyl sulfate (SDS) and sodium lauryl ether sulfate (SLES). In some embodiments, the surfactant is sodium dodecyl sulfate. Other suitable types of surfactants will be apparent to those of skill in the art and are to be considered within the scope of the present invention.

In some embodiments, the vacuum filtration process may be modified by leveling the MWNT suspension against the horizontal plane prior to filtration. When the suspension is vacuum adsorbed onto a porous substrate, the MWNTs are uniformly distributed to produce a membrane of uniform thickness.

In some embodiments, a filter manufactured with the aforementioned method is then treated with a suspension of titanium dioxide high surface area nanospheres and nanoclusters. In some embodiments, the titanium dioxide high surface area nanospheres have an average diameter of from 50, 70, 100, 125, or 150 nm, to 800, 900, or 1,000 nm, inclusive of surface features.

In some embodiments, a porous substrate comprising MWNTs uniformly distributed to a uniform thickness is treated with a suspension of titanium dioxide high surface area nanospheres and nanoclusters having dendrite or needle-like projections. In some embodiments, the vacuum filtration process may be modified by leveling the titanium dioxide high surface area nanospheres and nanoclusters suspension against the horizontal plane prior to filtration. The titanium dioxide high surface area nanospheres and nanoclusters suspension is then vacuum adsorbed onto the MWNTs. The resulting filter can then be washed with deionized water until the conductivity of the effluent water passed through the membrane is from about 0.1 μS/cm to about 1 μS/cm.

In some embodiments a number of filters having varying thicknesses were prepared by increasing the mass of MWNTs and TiO$_2$ high surface area nanospheres and nanoclusters while keeping their mass ratio near unity. In some embodiments, filters were prepared using 1, 5, 10, 20 and 50 mgs each of multi-walled carbon nanotubes and TiO$_2$ high surface area nanospheres and nanoclusters.

In other embodiments, the 30±20 μm thick membrane was used for an optimal flow rate of 0.5 mL/min corresponding to flux range 25 L/m$^2$·h.

Methods of Use

One aspect of the invention relates to a method of reducing at least one substance in a fluid. The method comprises passing a fluid through a filter for a time sufficient to immobilize or otherwise remove at least a portion of the substances from the fluid; wherein the filter comprises a layer of carbon nanotubes adsorbed onto a porous substrate; wherein the carbon nanotubes comprise titanium dioxide high surface area nanospheres and nanoclusters dispersed therein; and the resulting filter is permeable to the flow of the fluid.

In some embodiments, the substance comprises nonpolar and/or slightly polar organic compounds. In some embodiments, the substance comprises pharmaceuticals.

In some embodiments, the substance is removed from the fluid to a level of from about 5% to about 80% by weight.

In some embodiments, substances include, but are not limited to, polycyclic aromatic hydrocarbons, polychlorinated biphenyls (PCBs), phthalates, surfactants, dioxins, furans, organic compounds originating from food and household related products such as long chain fatty acids, sterols and caffeine; plasticizers, flame retardants, preservatives, antioxidants, chlorinated and non-chlorinated solvents, fragrances, insecticides, pesticides, fungicides, herbicides, pharmaceuticals, organic pollutants from road and vehicle pollution such as oil, grease, antifreeze and hydraulic fluid; dyes and iodinated X-ray contrast substances.

In some embodiments, the substance includes one or more pharmaceuticals selected from the group consisting of acetaminophen, carbamazepine and ibuprofen.

In some embodiments, pharmaceuticals that can be removed from water include, but are not limited to, (i) antidepressants such as, for example, agomelatine, amitriptyline, amoxapine, bupropion, citalopram, clomipramine, desipramine, doxepin, duloxetine, escitalopram, fluvoxamine, fluoxetine, gepirone, imipramine, ipsapirone, isocarboxazid, maprotiline, mirtazepine, nortriptyline, nefazodone, paroxetine, phenelzine, protriptyline, ramelteon, reboxetine, robalzotan, selegiline, sertraline, sibutramine, thionisoxetine, tranylcypromaine, trazodone, trimipramine, venlafaxine, and equivalents and pharmaceutically active isomer(s) and metabolite(s) thereof, (ii) antipsychotics, such as, for example, amisulpride, aripiprazole, asenapine, benzisoxidil, bifeprunox, carbamazepine, clozapine, chlorpromazine, debenzapines, dibenzapine, divalproex, droperidol, fluphenazine, haloperidol, iloperidone, loxapine, mesoridazine, molindone, olanzapine, paliperidone, perphenazine, phenothiazine, phenylbutylpiperidine, pimozide, prochlorperazine, quetiapine, risperidone, sertindole, sulpiride, suproclone, thioridazine, thiothixene, trifluoperazine, trimetozine, valproate, valproic acid, zotepine, ziprasidone, and equivalents and pharmaceutically active isomer(s) and metabolite(s) thereof, (iii) anxiolytics, such as, for example, alnespirone, azapirones, benzodiazepines, and barbiturates, such as, for example, adinazolam, alprazolam, balezepam, bentazepam, bromazepam, brotizolam, buspirone, clonazepam, clorazepate, chlordiazepoxide, cyprazepam, diazepam, estazolam, fenobam, flunitrazepam, flurazepam, fosazepam, lorazepam, lormetazepam, meprobamate, midazolam, nitrazepam, oxazepam, prazepam, quazepam, reclazepam, suriclone, tracazolate, trepipam, temazepam, triazolam, uldazepam, zolazepam, and equivalents and pharmaceutically active isomer(s) and metabolite(s) thereof, (iv) anticonvulsants, such as, for example, carbamazepine, oxcarbazepine, valproate, lamotrigine, gabapentin, topiramate, phenyloin, ethosuximide, and equivalents and pharmaceutically active isomer(s) and metabolite(s) thereof, (v) Alzheimer's therapies, such as, for example, donepezil, galantamine, memantine, rivastigmine, tacrine, and equivalents and pharmaceutically active isomer(s) and metabolite(s) thereof, (vi) Parkinson's therapies and agents for the treatment of extrapyramidal symptoms, such as, for example, levodopa, carbidopa, amantadine, pramipexole, ropinirole, pergolide, cabergoline, apomorphine, bromocriptine, MAOB inhibitors (i.e., selegine and rasagiline), COMT inhibitors (i.e., entacapone and tolcapone), alpha-2 inhibitors, anticholinergics (i.e., benztropine, biperiden, orphenadrine, procyclidine, and trihexyphenidyl), dopamine reuptake inhibitors, NMDA antagonists, Nicotine agonists, Dopamine agonists, and inhibitors of neuronal nitric oxide synthase, and equivalents and pharmaceutically active isomer(s) and metabolite(s) thereof, (vii) migraine therapies, such as, for example, almotriptan, amantadine, bromocriptine, butalbital, cabergoline, dichloralphenazone, eletriptan, frovatriptan, lisuride, naratriptan, pergolide, pramipexole, rizatriptan, ropinirole, sumatriptan, zolmitriptan, zomitriptan, and equivalents and pharmaceutically active isomer(s) and metabolite(s) thereof, (viii) stroke therapies, such as, for example, abciximab, activase, NXY-059, citicoline, crobenetine, desmoteplase, repinotan, traxoprodil, and equivalents and pharmaceutically active isomer(s) and metabolite(s) thereof, (ix) urinary incontinence therapies, such as, for example, darafenacin, dicyclomine, falvoxate, imipramine, desipramine, oxybutynin, propiverine, propanthedine, robalzotan, solifenacin, alfazosin, doxazosin, terazosin, tolterodine, and equivalents and pharmaceutically active isomer(s) and metabolite(s) thereof, (x) neuropathic pain therapies, such as, for example, gabapentin, lidoderm, pregablin, and equivalents and pharmaceutically active isomer(s) and metabolite(s) thereof, (xi) nociceptive pain therapies, such as, for example, celecoxib, codeine, diclofenac, etoricoxib, fentanyl, hydrocodone, hydromorphone, levo-alpha-acetylmethadol, loxoprofen, lumiracoxib, meperidine, methadone, morphine, naproxen, oxycodone, paracetamol, propoxyphene, rofecoxib, sufentanyl, valdecoxib, and equivalents and pharmaceutically active isomer(s) and metabolite(s) thereof, (xii) insomnia therapies and sedative hypnotics, such as, for example, agomelatine, allobarbital, alonimid, amobarbital, benzoctamine, butabarbital, capuride, choral hydrate, clonazepam, chlorazepate, cloperidone, clorethate, dexclamol, estazolam, eszopiclone, ethchlorvynol, etomidate, flurazepam, glutethimide, halazepam, hydroxyzine, mecloqualone, melatonin, mephobarbital, methaqualone, midaflur, midazolam, nisobamate, pagoclone, pentobarbital, perlapine, phenobarbital, propofol, quazepam, ramelteon, roletamide, suproclone, temazepam, triazolam, triclofos, secobarbital, zaleplon, zolpidem, zopiclone and equivalents and pharmaceutically active isomer(s) and metabolite(s) thereof, (xiii) mood stabilizers, such is, for example, carbamazepine, divalproex, gabapentin, lamotrigine, lithium, olanzapine, oxycarbazepine, quetiapine, valproate, valproic acid, verapamil, and equivalents and pharmaceutically active isomer(s) and metabolite(s) thereof, (xiv) obesity therapies, such as, for example, anti-obesity drugs that affect energy expenditure, glycolysis, gluconeogenesis, glucogenolysis, lipolysis, lipogenesis, fat absorption, fat storage, fat excretion, hunger and/or satiety and/or craving mechanisms, appetite/motivation, food intake, and G-I motility; very low calorie diets (VLCD); and low-calorie diets (LCD);

(xv) therapeutic agents useful in treating obesity associated disorders, such as, for example, biguanide drugs, oral antihyperglycemics (these are divided into prandial glucose regulators and alpha-glucosidase inhibitors), PPAR modulating agents, such as, for example, PPAR alpha and/or gamma agonists; sulfonylureas; cholesterol-lowering agents, such as, for example, inhibitors of HMG-CoA reductase (3-hydroxy-3-methylglutaryl coenzyme A reductase); an inhibitor of the ileal bile acid transport system (IBAT inhibitor); a bile acid binding resin; bile acid sequestering agent, such as, for example, colestipol, cholestyramine, or cholestagel; a CETP (cholesteryl ester transfer protein) inhibitor; a cholesterol absorption antagonist; a MTP (microsomal transfer protein) inhibitor; a nicotinic acid derivative, including slow release and combination products; a phytosterol compound; probucol; an anti-coagulant omega-3 fatty acid; an anti-obesity therapy, such as, for example, sibutramine, phentermine, orlistat, bupropion, ephedrine, and thyroxine; an antihypertensive, such as, for example, an angiotensin converting enzyme (ACE) inhibitor, an angiotensin II receptor antagonist, an adrenergic blocker, an alpha adrenergic blocker, a beta adrenergic blocker, a mixed alpha/beta adrenergic blocker, an adrenergic stimulant, calcium channel blocker, an AT-1 blocker, a saluretic, a diuretic, and a vasodilator; a melanin concentrating hormone (MCH) modulator; an NPY receptor modulator; an orexin receptor modulator; a phosphoinositide-dependent protein kinase (PDK) modulator; modulators of nuclear receptors, such as, for example, LXR, FXR, RXR, GR, ERRα, β, PPARα, β, γ and RORalpha; a monoamine transmission-modulating agent, such as, for example, a selective serotonin reuptake inhibitor (SSRI), a noradrenaline reuptake inhibitor (NARI), a noradrenaline-serotonin reuptake inhibitor (SNRI), a monoamine oxidase inhibitor (MAOI), a tricyclic antidepressive agent (TCA), a noradrenergic and specific serotonergic antidepressant (NaSSA): a serotonin receptor modulator; a leptin/leptin receptor modulator; a ghrelin/ghrelin receptor modulator; a DPP-IV inhibitor; and equivalents and pharmaceutically active isomer(s), metabolite(s), and pharmaceutically acceptable salts, solvates, and prodrugs thereof, (xvi) agents for treating attention deficit hyperactivity disorder (ADHD), such as, for example, amphetamine, methamphetamine, dextroamphetamine, atomoxetine, methylphenidate, dexmethylphenidate, modafinil, and equivalents and pharmaceutically active isomer(s) and metabolite(s) thereof, (xvii) agents used to treat substance abuse disorders, dependence, and withdrawal, such as, for example, nicotine replacement therapies (i.e., gum, patches, and nasal spray); nicotinergic receptor agonists, partial agonists, and antagonists, (e.g. varenicline); acomprosate, bupropion, clonidine, disulfuram, methadone, naloxone, naltrexone, and equivalents and pharmaceutically active isomer(s) and metabolite(s) thereof, (xviii) antibacterials, antifungals, antivirals, and equivalents and pharmaceutically active isomer(s) and metabolite(s) thereof, (xix) analgesics, such as, for example, acetaminophen and equivalents and pharmaceutically active isomer(s) and metabolite(s) thereof, (xx) nonsteroidal anti-inflammatories such as, for example, aspirin (acetylsalicylic acid), diclofenac, dexibuprofen, diflunisal, etodolac, fenoprofen, flufenamic acid, flurbiprofen, ibuprofen, indomethacin, ketoprofen, ketorolac, lornoxicam, loxoprofen, meclofenamic acid, meloxicam, nabumetone, naproxen, oxaprozin, piroxicam, salsalate, sulindac, tenoxicam, tolmetin tolfenamic acid and equivalents and pharmaceutically active isomer(s) and metabolite(s) thereof.

In some embodiments, the filter may be photo-regenerated, e.g., by exposure to an ultraviolet light source. In some embodiments the photo-regeneration comprises photocatalytic degradation of the adsorbed constituent(s) and the elimination of the degraded constituent from the filter.

Applications of the cleaned fluid (i.e., filtrate), specifically clean water, include potable water, irrigation, medical and industrial water. Sources of de-ionized water are used for industrial processes including, but are not limited to, semiconductor manufacturing, metal plating, and general chemical industry and laboratory uses.

The present invention is further described by the following non-limiting examples.

EXAMPLES

Membranes of various thicknesses were prepared from multi-walled carbon nanotubes (MWNTs) followed by the attachment of titanium dioxide onto the multi-walled carbon nanotube bed. Thorough characterization of these membranes was carried out by a number of techniques, including analytical scanning electron microscopy (SEM), electron dispersive x-ray spectroscopy (EDS), zeta potential measurements, thermogravimetric analysis (TGA), and hydrophobicity estimation. Then, the efficacy of these membranes for removing common pharmaceuticals from water was evaluated after measuring their permeate flux under constant hydraulic head conditions. Later, the potential for these membranes to be regenerated photocatalytically was studied. Finally, the effect of pH on removal of ibuprofen was explored and the adsorption mechanism of that particular pharmaceutical on MWNTs was proposed.

Multi-walled carbon nanotubes (MWNTs) were purchased from Cheap Tubes Inc. (Brattleboro, Vt., USA). The MWNTs were >99% pure, with an outer diameter range of 13-18 nm and lengths of up to 30 μm according to the manufacturer. Sodium hydroxide (98.8%) was provided by Poch Basic (Gliwice, Poland). Reagent-grade sodium dodecyl sulfate (SDS, ≥99%) and sodium chloride (cell culture tested) were obtained from Sigma Aldrich (St. Louis, Mo., USA). Vacuum filtration was carried out using Millipore (Millipore Corp., Billerica, Mass., USA) mixed cellulose acetate filter papers with a pore size of 220 nm. Fresh deionized water with an average resistivity of 18.2 MΩ cm was used throughout the course of experimentation. Titanium(IV) oxide, anatase, was purchased from Sigma Aldrich (St. Louis, Mo., USA). Pharmaceuticals were also obtained from Sigma Aldrich (St. Louis, Mo., USA). Acetaminophen quality met US Pharmacopeial Convention (USP) testing specifications by having at least 98% purity; ibuprofen was pharmaceutical secondary standard which was traceable to U.S. Pat. No. 1,335,508), PhEur (10020000), and BP (539); and carbamazepine was ≥98%, pure powder.

Example 1

Preparation of $TiO_2$ High Surface Area Nanosphere Dendrites

A 1 L round-bottomed flask was charged with titanium dioxide (FIG. 1) (anatase, Sigma Aldrich cat #232033, 10 g), 10 M sodium hydroxide (500 mL) and equipped with a magnetic stirring bar. The suspension was stirred with a magnetic stirrer for 2 hours. The suspension was transferred to a 600 mL autoclave bottle and autoclaved at 120° C. for 18 hours. The heterogeneous solution was centrifuged at ≥3000 rpm in a Beckman Coulter Allerga 25R centrifuge with a fixed angle TA-10-250 rotor having maximum r=137 mm for 0.5 hours and the 10 M sodium hydroxide solution was carefully decanted off. The $TiO_2$ high surface area nanospheres and nanoclusters hence formed, were washed with 1 M hydrochloric acid to neutralize any excess sodium hydroxide. The aqueous washings were carefully decanted off and their pH monitored. The 1 M hydrochloric acid washings were carried out until all alkali was neutralized.

Figure 2:
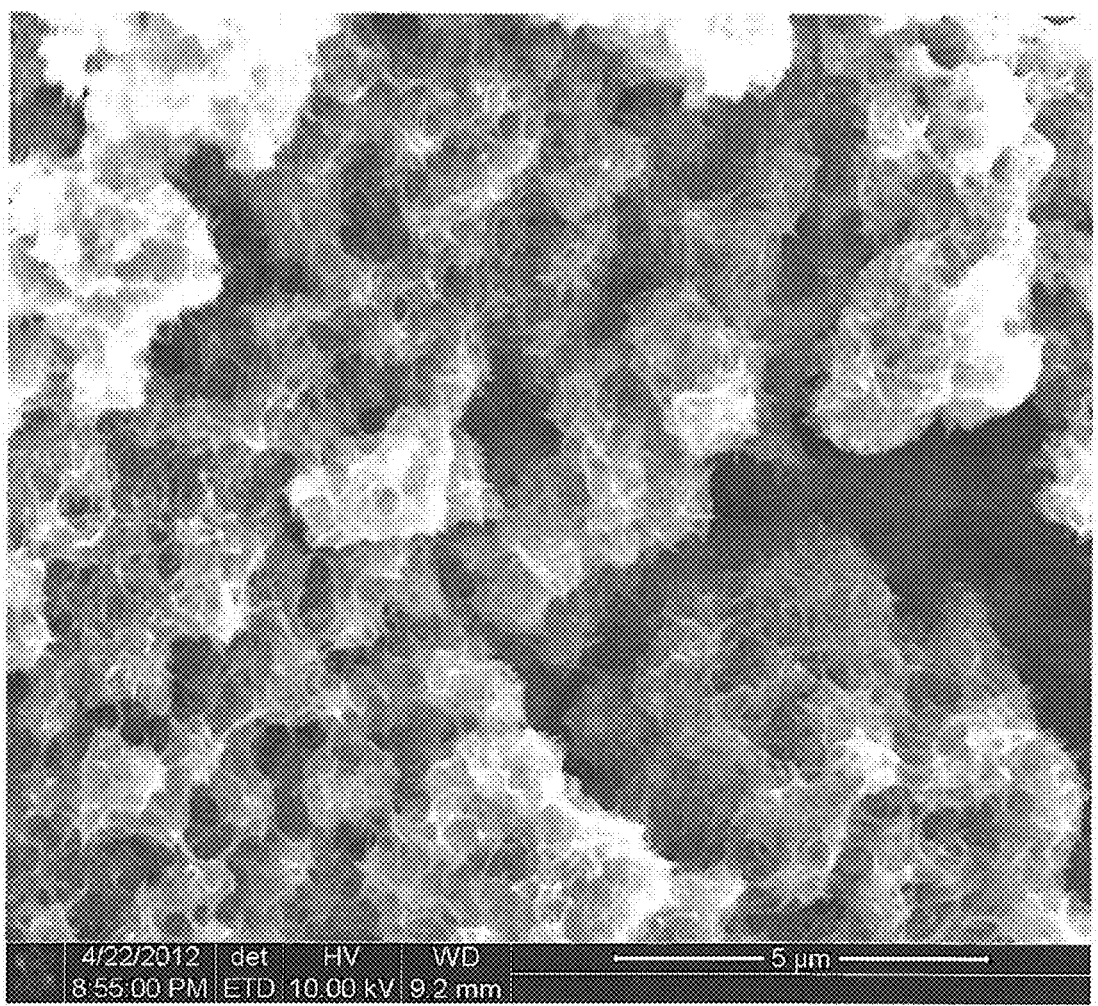
FIG. 2: A SEM micrograph of Anatase-TiO$_2$ dentritic spheres after hydrothermal treatment.

The $TiO_2$ high surface area nanospheres and nanoclusters having dendrite or needle-like projections were washed multiple times with deionized water (resistivity >18 MΩ). The washing procedure involved suspending the high surface area nanospheres and nanoclusters in deionized water, centrifuging at ≥4000 rpm [2450 g] (i.e., to recover "$TiO_2$ nanospheres" from water) and decanting the supernatant wash water. (FIG. 2).

Note: A minimum of six, and up to eight, washing cycles were carried out for each 10 g batch of $TiO_2$ high surface area nanospheres and nanoclusters. On average, 200 mL of deionized water was used to wash 1 mg of $TiO_2$ high surface area nanospheres and nanoclusters to ensure the complete removal of residual sodium hydroxide and/or hydrochloric acid. The conductivity of the supernatants was periodically measured to evaluate the washing efficiency. The washings were performed until the change in conductivity of washing water reached its minimum value. The $TiO_2$ high surface area nanospheres and nanoclusters were finally suspended in deionized water to obtain the final concentration of 1 mg/mL.

In other embodiments, $TiO_2$ high surface area dendritic, $TiO_2$ nanospheres using hydrothermal treatment for use in filters were prepared as follows. A 0.02 w/v % titanium dioxide (anatase) suspension was prepared in 8-12 M sodium hydroxide aqueous solution (FIG. 1). The suspension was stirred using magnetic stirrer for 2 hrs. The suspension was hydrothermalized by applying steam pressure (28-32 psi) and temperature (115-130° C.) for 18-22 hours. The hydrothermalized precipitates were recovered from solution through centrifugation ≥1378×g. As shown in FIG. 2, the dendritic $TiO_2$ spheres, hence formed, were refluxed with 1 M hydrochloric acid until excess sodium hydroxide was neutralized.

After, the dendritic $TiO_2$ spheres were washed multiple times with deionized water. The washing procedure involved suspending the nanospheres in deionized water followed by centrifugation at ≥2450×g (i.e., to recover dendritic $TiO_2$ spheres from water) and decanting the supernatant wash-water. A minimum of six washing cycles were carried out for each 10 g batch of dendritic $TiO_2$ spheres. The conductivity of supernatant was periodically measured to evaluate the washing efficiency. The washings were performed until the change in conductivity of washing water reached its minimum value.

The dendritic $TiO_2$ spheres were finally suspended in deionized water to obtain the final conc. of 1 mg/mL [Solution A].

Example 2

Preparation of Multi-Walled Carbon Nanotubes (MWNTs) Suspension

Multi-walled carbon nanotubes (1 g, >99%, Cheap Tubes Inc.) with an outer diameter range of 13-18 nm and lengths of up to 30 μm according to the manufacturer were suspended in a 1% sodium dodecyl sulfate (1 L) solution. The suspension was sonicated in a bath sonicator, operating at 48 kHz, for 6 hours. The resulting suspension of MWNTs (1 mg MWNTs/mL, 1% SDS solution) was kept as such for further use.

In other embodiments, one liter of anionic, cationic, and/or non-ionic surfactant solution (below its critical micelle concentration) was prepared. One gram (≥99% pure) multiwalled carbon nanotubes (MWNTs) were suspended in solution. The outer diameter and length of MWNTs were 8-80 nm and 1-10 μm, respectively.

The ultrasonication was performed on the solution until stable suspensions of MWNTs were obtained. The stability of MWNTs was determined over time using UV absorption at 800 nm. The resulting solution of MWNTs (1 mg MWNTs/mL+surfactant) was kept as such for further use [Solution B].

Example 3

Fabrication of MWNTs-$TiO_2$ Membranes

For the fabrication of MWNT-$TiO_2$ membranes, Solution B, from Example 2, (10 mL) was vacuum filtered through a Millipore nitrocellulose membrane, with a pore size of 220 nm, using a vacuum pump operating at −80 KPa.

Note: Prior to filtration, Solution B was leveled against the horizontal plane in the vacuum filtration funnel by using a leveler to obtain an even distribution of deposited MWNTs resulting in a membrane of uniform thickness. After depositing the MWNTs, the MWNTs membrane was washed with deionized water (10 mL). Solution A, Example 1, (10 mL) was leveled against the horizontal plane in the vacuum filtration funnel by using a leveler to obtain an even distribution of deposited titanium dioxide high surface area nanospheres and nanoclusters resulting in a membrane of uniform thickness. Solution A was vacuum filtered through the MWNTs membrane using a vacuum pump operating at −80 KPa. This allowed the $TiO_2$ high surface area nanospheres and nanoclusters to adsorb onto the MWNTs membrane owing to the needle like structures on their surface.

Note: It was found the $TiO_2$ nanospheres without the dendrite or needle-like projections had significantly reduced adherence or penetration to the MWNTs membrane and readily passed through the membrane. The MWNTs-$TiO_2$ membrane was washed with deionized water equivalent to 100,000 times its mass. (i.e., 20 mg MWNTs-$TiO_2$ membrane was washed with 2000 mL of deionized water). The washing was carried out in order to remove the surfactant and other soluble impurities until the conductivity of the effluent passing through the membrane decreased from >400 μS/cm to <1 μS/cm.

Figure 5:
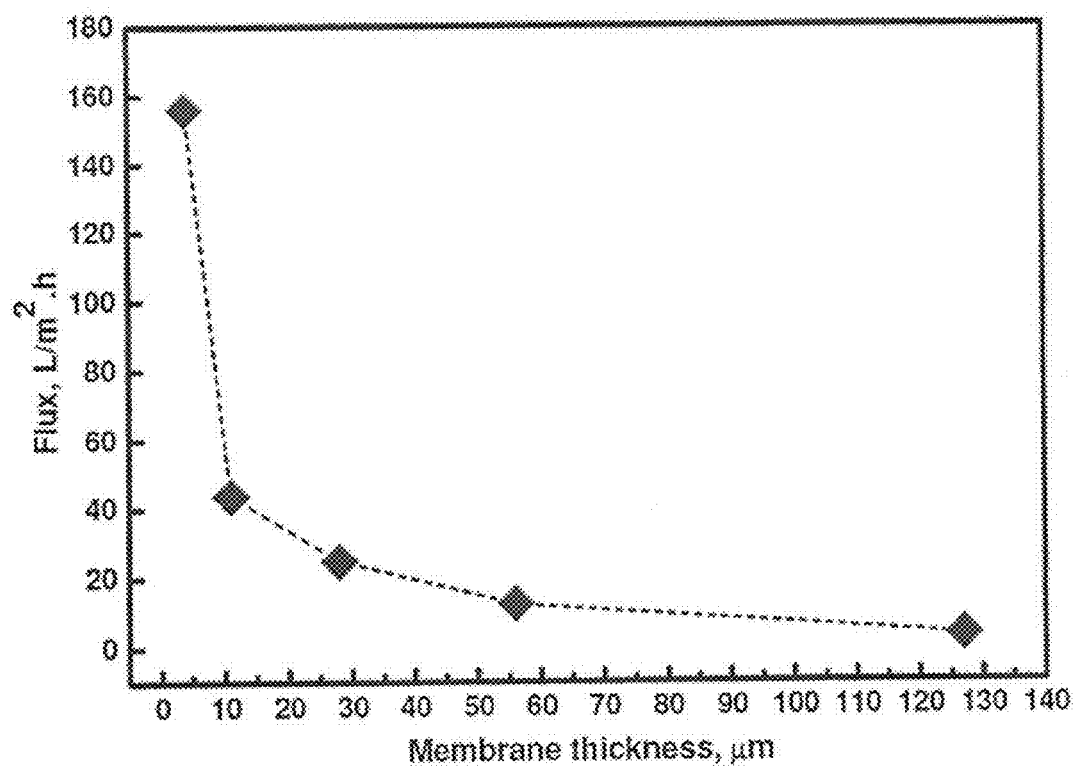
FIG. 5: Permeate fluxes through MWNTs-TiO$_2$ membranes for water were inversely proportional to their thicknesses.

The MWNTs-$TiO_2$ membrane was air dried at room temperature. The relationship between permeate flux and thickness of MWNTs-$TiO_2$ membranes is presented in FIG. 5. The plot shows flux of deionized water through MWNT-$TiO_2$ membranes of various thicknesses under the effect of gravity. The pressure was kept constant at 3.43 N cm$^{-2}$ by controlling the water head.

Figure 9:
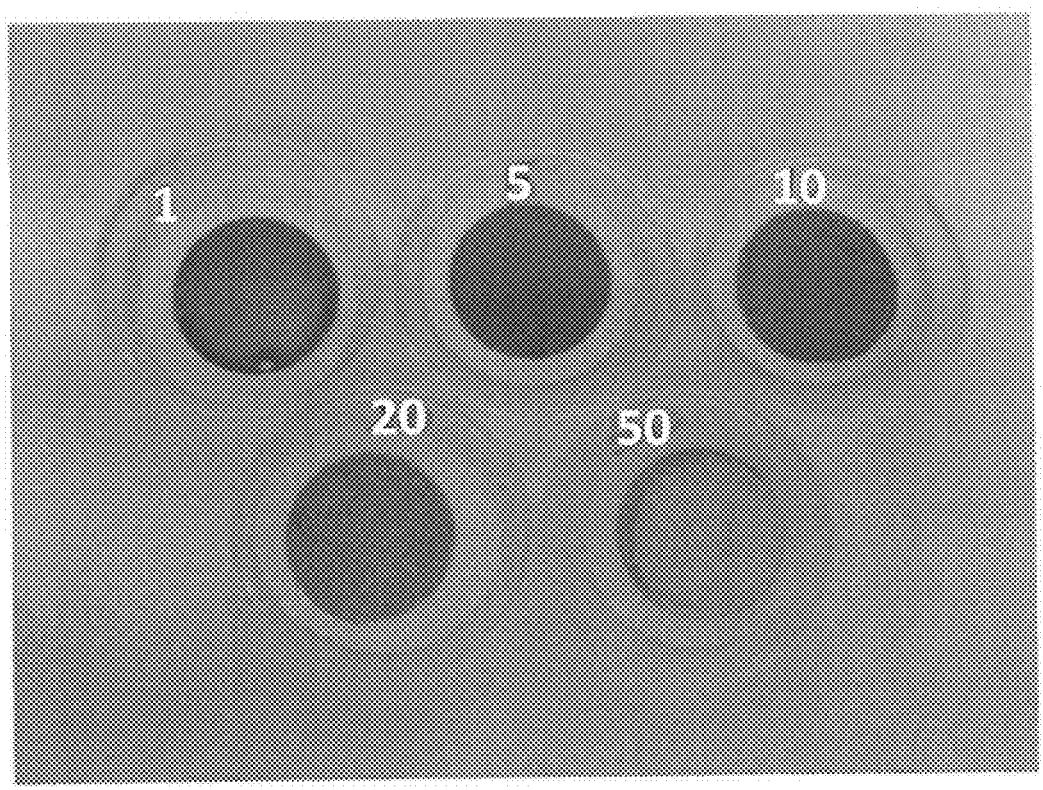
FIG. 9: MWNTs-TiO$_2$ membranes with different loadings.

A number of membranes having varying thicknesses were prepared by increasing the mass of MWNTs and $TiO_2$, while keeping their mass ratio near unity (FIG. 9). The membrane thickness was observed to be inversely related to the permeate flux. Membranes with MWNT and $TiO_2$ masses of 10 mg each and having an aqueous permeate flux of 25 L h$^{-1}$m$^{-2}$ were selected for further study. In other embodiments, 10 mL of MWNTs suspension was vacuum filtered through 200-500 nm porous membrane (nitrocellulose, mixed ester, cellulose acetate, glass microfiber, nylon, or PTFE) used as a substratum under vacuum filtration. Prior to filtration, the MWNTs suspension was leveled against the horizontal plane in the vacuum filtration funnel by using a leveler, to obtain an even distribution of deposited MWNTs resulting in a membrane of uniform thickness. After depositing MWNTs, the MWNTs membrane was washed with 10 mL of deionized water. 1-20 mL (1 mg/mL) suspension of dendritic $TiO_2$ spheres was then vacuum-filtered through the MWNTs membrane using vacuum filtration. This allowed dendritic $TiO_2$ spheres to partially penetrate into the MWNTs membrane owing to the needle like structures on their surface.

Note: The effluent water flux was inversely proportional to the thickness of MWNTs-$TiO_2$. A 10 to 50 μm thick membrane was selected for an optimal flow rate. The flow rate ranged from 0.25 to 1.0 mL/min corresponding to flux range 25 L/m$^2$·h.

The MWNTs-$TiO_2$ membrane was finally washed with deionized water until the ionic conductivity of effluent water was equivalent to its influent deionized water. The mass of water required for washing was 100,000 times more than mass of membrane. MWNTs-$TiO_2$ membrane was air dried at room temperature before using it for organics removal from water.

Example 3

Characterization of MWNTs-TiO$_2$ Membranes

Figure 4:
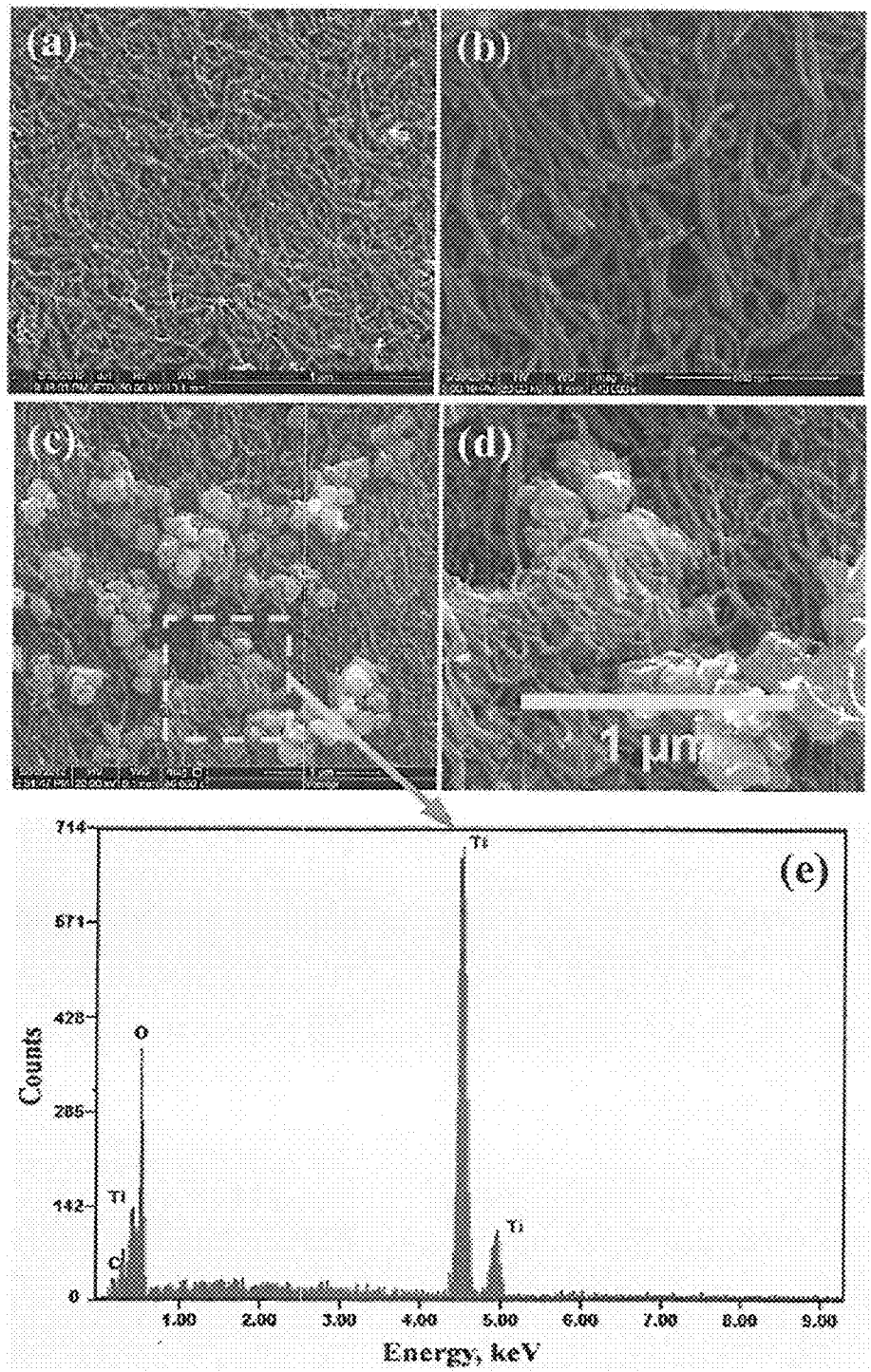
FIG. 4: SEM and EDS characterization of nitrocellulose membrane containing adsorbed multiwall carbon nanotubes.

Electron microscopy, zeta potential technique, and TGA were applied to characterize MWNTs, in-house pretreated TiO$_2$ spheres, and MWNT-TiO$_2$ membrane. The microstructure and morphology of the three materials were analyzed using an SEM. The electron micrograph in FIG. 4(a) showed the overall structure of a loosely packed dense mesh or layer of MWNTs that act together as a water-permeable membrane. The higher resolution image in FIG. 4(b) showed that nanotubes stack into a non-uniform, random arrangement. Each square centimeter of the membrane contains a large number of MWNTs in which the interstices generated between the randomly ordered MWNTs may allow water and other small molecules to pass through.

The structures of MWNTs, in-house pretreated TiO$_2$ spheres, and MWNT-TiO$_2$ membranes, were examined by scanning electron microscopy. An FEI, Quanta FEG 250 SEM, operating at ~5-30 keV was employed for this purpose. The microscopy samples were coated with a ~50 nm thick gold and palladium layer using a GATAN Model 682 Precision Etching Coating System (PECS). The elemental microanalysis of specified regions on the samples was performed using an EDAX Energy Dispersive Spectroscopy (EDS) system, and TEAM software.

The SEM image showed the in-house pretreated TiO$_2$ hierarchical structures obtained from the randomly sized as-received TiO$_2$ anatase particles. These samples were porous and exhibit a spherical morphology (diameter approximately 1-3 microns) with superimposed high surface area nanospheres and nanoclusters. The size of the high surface area nanospheres and nanoclusters was between 100-200 nm. The in-house TiO$_2$ comprising high surface area nanospheres and nanoclusters will be referred to as "TiO$_2$ spheres" throughout the remainder of the text. The morphology of the "TiO$_2$ spheres", however, could not be maintained during their pressure assisted deposition on the MWNTs layer. The FIG. 4(c) and FIG. 4(d) indicate the disintegration of these "TiO$_2$ spheres" into relatively smaller fractions.

The porous morphology and the ultra-thin, superimposed structures (high surface area nanospheres and nanoclusters) significantly increased the overall specific surface area of the "TiO$_2$ spheres". This might have positively impacted the photocatalytic character of the TiO$_2$. FIG. 4(e) represents the successful adsorption of functionalized "TiO$_2$ spheres" on the surface of the MWNT membrane.

The "TiO$_2$ spheres" appear to be uniformly distributed and in some cases they cluster together to form a network. The higher resolution image of the selected area in FIG. 4(d) shows nanotubes entangling the "TiO$_2$ spheres" and effectively binding the two together. This arrangement is expected to offer minimum resistance to fluid flow. It can be observed that the adsorbed TiO$_2$ did not maintain the exactly same upper most surface morphology as the treated TiO$_2$. This might be due to the loss of needle like upper most surfaces of these "TiO$_2$ spheres" when adsorption was attempted on the MWNT layer through vacuum filtration. The EDS analysis was performed on the MWNT-TiO$_2$ membrane to look into the elemental composition of the membrane. FIG. 4(e), the EDS elemental analysis result, indicated the presence of carbon, titanium, and oxygen, thereby confirming these elemental components of the MWNTs-TiO$_2$ membrane.

Zeta Potential measurements of the charge on MWNTs was measured using a ZetaPALS analyzer (Brookhaven, N.Y., USA). The Smoluchowski equation was used to calculate zeta potentials from electrophoretic mobilities. Electrophoretic mobilities of MWNTs were measured by varying conductivity of background solution from deionized water to 1, 10, 50, and 100 mM sodium chloride solution.

Figure 3:
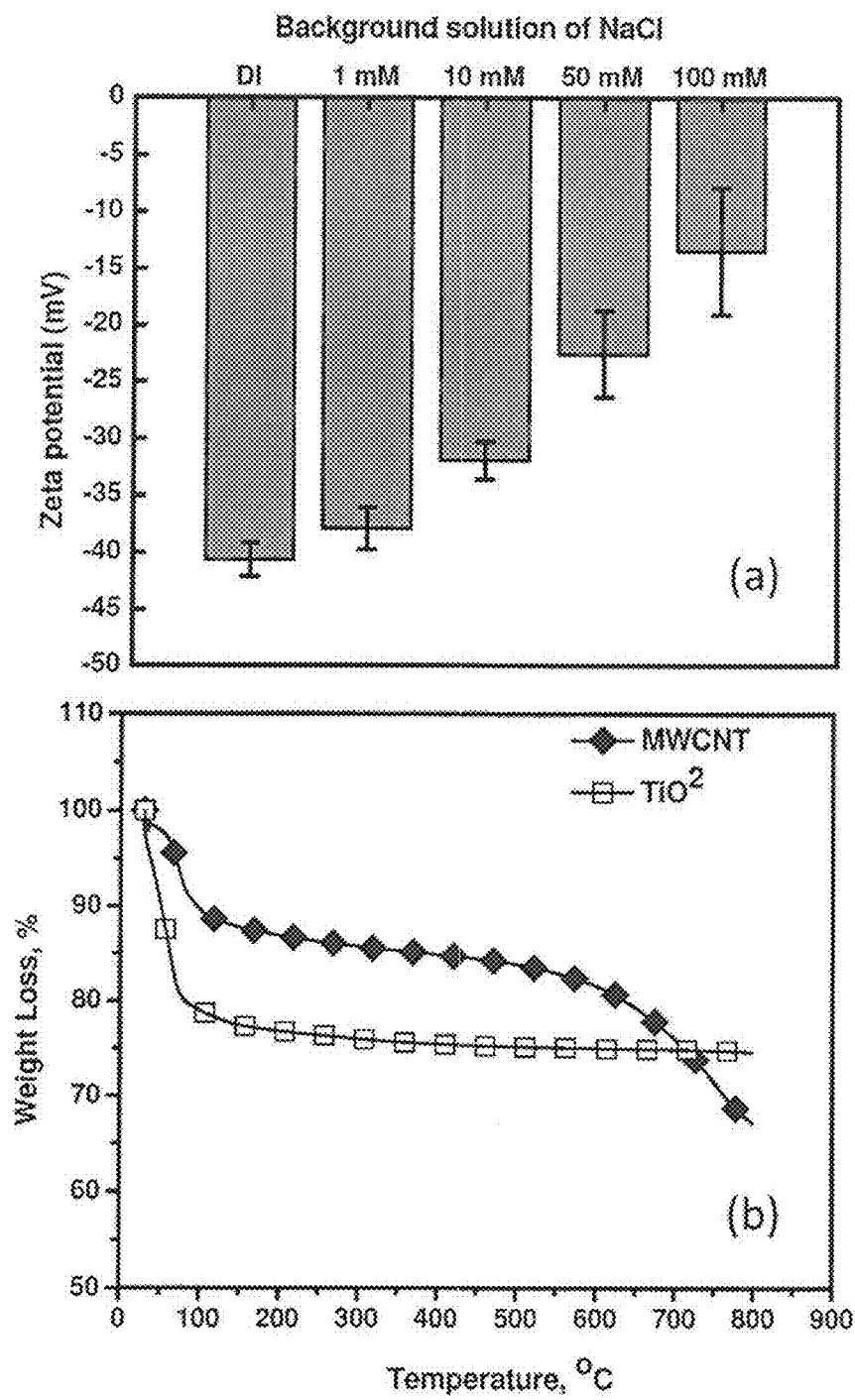
FIG. 3: Zeta potential and TGA of MWNTs and TiO$_2$.

Zeta potential measurements revealed that MWNTs were negatively charged (FIG. 3(a)). This negative charge on MWNTs decreased with an increase in concentration of sodium chloride in the background medium (i.e., water). The negative surface charge of MWNTs decreased from −40.6±1.5 mV to −22±3.9 mV upon increasing the concentration of sodium chloride from ~0 to 100 mM. This results in a decrease in negative zeta potential of MWNTs with increasing background salt concentration. The values of zeta potential observed in this study are comparable to earlier observed electrophoretic mobilities of similar materials.

Thermal gravimetric analysis of MWNTs, in-house pretreated TiO$_2$ high surface area nanospheres and nanoclusters, and MWNT-TiO$_2$ membranes was carried out using a Perkin-Elmer Thermogravimetric Analyzer (Waltham, Mass., USA) using nitrogen as a carrier gas. The temperature was gradually increased from 30° C. to 800° C. using approximately 10 mg of sample. The difference in weight over the temperature gradient provided the information about the sample.

The TGA analysis was carried out on MWNTs and TiO$_2$ in a nitrogen atmosphere in order to monitor their weight loss and thermal stability (FIG. 3(b)). In MWNTs, a 10% weight loss was observed between 53-100° C. This can be attributed to moisture, volatiles, and other impurities that have a low flash point. Insignificant transitions from 100-600° C. represent thermal stability of MWNTs up to 600° C. After 600° C., steep inclination of the weight loss curve indicates rapid degradation of MWNTs. The TGA instrument was limited to a maximum temperature of 800° C.; therefore, complete gasification of MWNTs could not be evidenced. For TiO$_2$, 22% weight loss was observed for the first 100° C. rise in temperature. This higher moisture content in "TiO$_2$ spheres" indicates the hydrophilicity of the material which is also evident from the increased hydrophilicity of MWNTs-TiO$_2$ membrane. After 100° C., the TiO$_2$ appeared to be stable to thermal degradation. TGA analysis yielded the purity of MWNTs and TiO$_2$ to be 90% and 78%, respectively, while accounting for all impurities including moisture and other volatiles.

Figure 10:
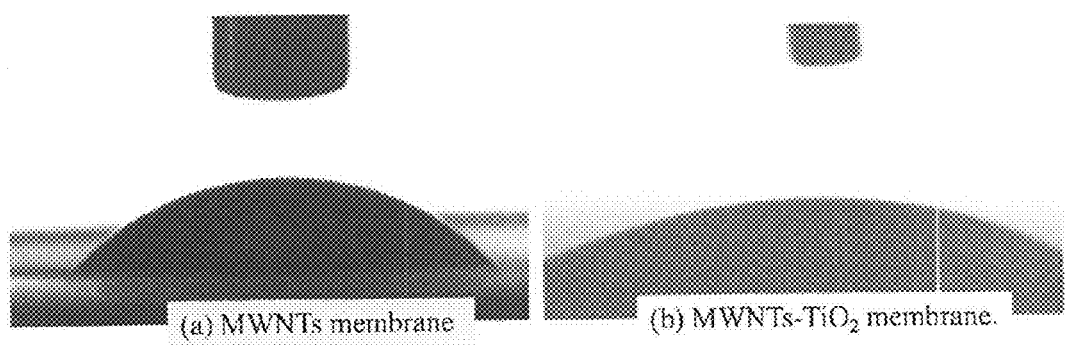
FIG. 10: Contact angle of deionized water with (a) MWNTs membrane and (b) MWNT-TiO$_2$ membrane.

The hydrophobicity of MWNTs and MWNTs-TiO$_2$ membranes was determined by contact angle measurement using a KRUSS apparatus (Hamburg, Germany). Initially, a microsyringe was used to manually generate deionized water drops on the membrane surface. The contact angle was calculated from a static image of the droplet taken immediately after contact with the surface using an image-processing program DSA1. The software estimated the contact angle by circle fitting the drop using the sessile drop method. FIG. 10 represents surface hydrophilicity of MWNTs-only and MWNTs-TiO$_2$ membranes. Contact angle measurements were applied to measure extent of hydrophilicity. The contact angles of both MWNTs (FIG. 10a) and MWNTs-TiO$_2$ (FIG. 10b) membranes were found to be less than the 90° showing that the membranes are hydrophilic. The MWNTs-TiO$_2$ membrane appeared to be more hydrophilic because the water droplet flattened quicker on it than on the MWNTs-only membrane surface.

Example 4

Removal of Pharmaceuticals from Water by MWNTs-TiO$_2$ Membranes

The ability of the MWNTs-TiO$_2$ membrane to remove pharmaceuticals from water was investigated. The pharmaceuticals, acetaminophen, ibuprofen, and carbamazepine, were selected on the basis of their high frequency of occurrence in water systems and their physicochemical properties (Table 1). A broad range of parameters like log K$_{ow}$ (0.46 to 3.97) and water solubilities (17.7 to 14000 mg/L) were covered by using these compounds as represented in Table 1.

TABLE 1

Physical Properties of Compounds

| Compound | CAS | Formula | Structure[35] | Mol. Wt (g/mol) | Log K$_{ow}$ | Water Solubility mg/L (25° C.) | Absorption wavelength (nm) | pKa |
|---|---|---|---|---|---|---|---|---|
| Acetaminophen | 103-90-2 | C$_8$H$_9$NO$_2$ | | 151.17 | 0.46 | 1.40E+04 | 244 | 9.5 |
| Ibuprofen | 15687-27-1 | C$_{13}$H$_{18}$O$_2$ | | 206.29 | 3.97 | 21 | 222 | 4.9 |
| Carbamazepine | 298-46-4 | C$_{15}$H$_{12}$N$_2$O | | 236.28 | 2.45 | 17.7 | 284 | 13.9[36] |

The pharmaceuticals, from solutions made in deionized water, were allowed to adsorb onto the MWNTs membrane (control) and MWNTs-TiO$_2$ membranes under gravity flow while maintaining a constant head. The flux of the pharmaceutical solution remained approximately constant over the course of the experiment by maintaining a constant hydraulic head. Effluent fractions were collected at regular intervals to determine the mass of pharmaceuticals removed with respect to time. Characteristic absorption wavelengths were used to develop calibration curves for pharmaceuticals concentrations in water (Table 1). The mass concentration of pharmaceuticals was determined by UV-Vis spectrophotometer, Model Evolution 300 manufactured by Thermo Fisher Scientific (Madison, Wis., USA).

Figure 6:
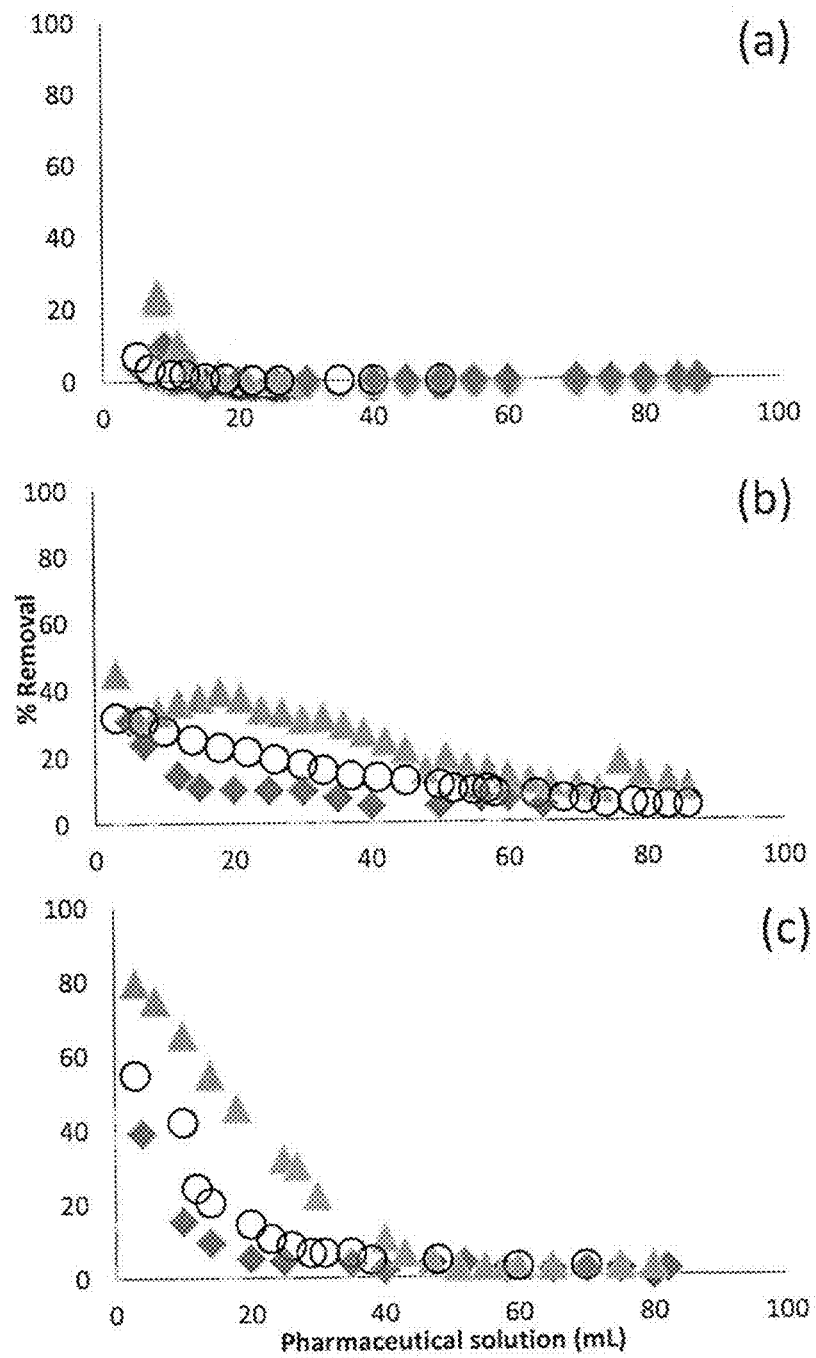
FIG. 6: Comparison of the removal of pharmaceutical compounds from water by the MWNTs membranes with and without TiO$_2$, before and after photo-regeneration.

Experiments were also conducted with MWNTs-only membrane (i.e., without any adsorbed "TiO$_2$ spheres") to compare pharmaceutical removal efficiencies and to establish controls. FIG. 6, shows the removal of pharmaceuticals from water by the MWNT and MWNTs-TiO$_2$ membranes under the same conditions; (◇), MWNT-TiO$_2$ membrane (Δ) and MWNT-TiO$_2$ membrane after photo-regeneration (○). The influent pharmaceutical concentration (10 mg/L) and solution flux (40 L/m$^2$·h) were kept constant, and effluent fractions were analyzed to assess performance of membranes and their saturation over time. The MWNTs-TiO$_2$ membranes were photo-regenerated (cleaned) using UV-Vis 254 nm light. The UV light source was a 6×8 Watt-312 nm tube. The membrane was dipped in 50 mL deionized water in an aluminum dish (10.5 cm diameter). The average UV exposure time was 2 hrs.

The pharmaceutical removal efficiencies of MWNTs-TiO$_2$ membranes were consistently higher than that of MWNTs-only membranes. This can be explained by simultaneous adsorption and degradation of pharmaceuticals in the presence of TiO$_2$. FIG. 6 shows that acetaminophen carries the least affinity towards MWNTs when compared to the other two compounds. The initial sorptive removal for acetaminophen was ~10% when 10 mg/L acetaminophen solution was allowed to flow through MWNTs membrane (FIG. 6a). However, in the case of the MWNTs-TiO$_2$ membrane, this removal increased to ~24% (2.4 mg/L effluent from 10 mg/L influent solution). Later, this removal gradually decreased to <1% when 20 mL of acetaminophen solution was passed through. The MWNT-TiO$_2$ membrane was regenerated by UV at 254 nm as described earlier (Materials and Methods) and examined for its effectiveness in removing the same (10 mg/L) acetaminophen solution. After regeneration, the initial removal efficiency of the MWNT-TiO$_2$ membrane decreased to ~18% (compared to 24% in the 1st run) removal of acetaminophen. It should be noted that, even after regeneration, the adsorption removal of the MWNT-TiO$_2$ membrane was eighty percent higher than in the case of the MWNT-only membrane which supports the hypothesis of continued adsorption and photolysis of acetaminophen on the MWNT-TiO$_2$ membrane.

The MWNTs-only and MWNT-TiO$_2$ membranes were tested for a more hydrophobic pharmaceutical, ibuprofen, as represented in FIG. 6b. The initial sorptive removal efficiency and saturation time of both (MWNTs-only and MWNT-TiO$_2$) membranes for ibuprofen were higher than that of acetaminophen. A maximum of 30% ibuprofen was observed to be removed initially by the MWNTs-only membrane for the first 5 mL of 10 mg/L ibuprofen solution. This removal efficiency gradually decreased to one-third (10%) upon the passage of an additional 10 mL of the same solution. Finally, the adsorption removal decreased to ~5% after the continuous flow of (a total) 40 mL ibuprofen solution, indicating a slow attainment of sorbent saturation. In the case of the MWNT-TiO$_2$ membrane, initially ~45% (4.5 mL) ibuprofen was removed. After 20 mL of the solution had passed through the membrane, the removal of ibuprofen was still 37%, significantly higher than in the case of the MWNTs-only membrane. The adsorption removal efficiency of the MWNT-TiO$_2$ membrane decreased to 6% after passing 100 mL ibuprofen (10 mg/L) solution. After regeneration, the MWNT-TiO$_2$ membrane was effective in removing only 32% of influent ibuprofen, initially. The slow sorbent saturation trend of ibuprofen removal was similar in the MWNTs-only and MWNT-TiO$_2$ (before and after regeneration) membranes. Carbamazepine exhibited high affinity towards both MWNTs-only and MWNT-TiO$_2$ membranes (FIG. 6c). Carbamazepine removal by MWNT-TiO$_2$ membrane started from 80% of the influent concentration (8 mg/L was removed from 10 mg/L solution) which was approximately double that of MWNTs-only membrane (39% removal). After 20 mL, the MWNT-TiO$_2$ membrane was still able to remove ~45% of the carbamazepine from the solution compared to only 5% removal by the MWNTs-only membrane.

However, in the case of carbamazepine, the membranes saturated earlier when compared to ibuprofen. It was also observed that the removal efficiency of the membrane decreased to <5% after passing 50 mL of carbamazepine solution from the two membranes. Whereas, at the same time stage (after 50 mL solution passed), ~20% of the ibuprofen was still being removed from the solution by the MWNT-TiO$_2$ membrane. The regenerated MWNT-TiO$_2$ membrane initially removed 53% of carbamazepine from solution which was still 13% higher than the removal by the non-photoregenerable MWNTs-only membrane.

Figure 7:
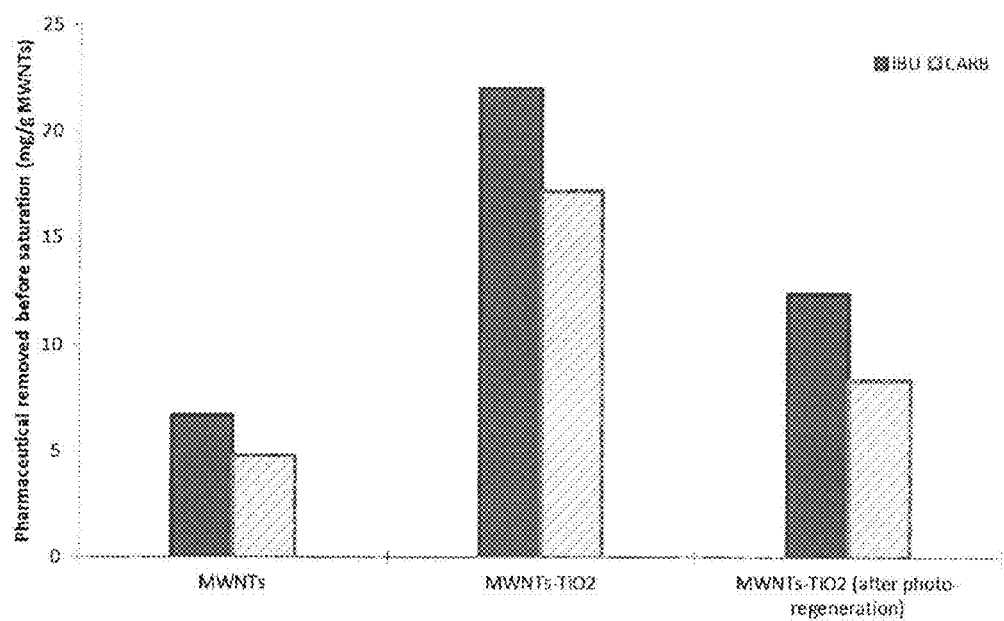
FIG. 7: The mass loadings of pharmaceuticals on MWNT and MWNT-TiO$_2$ membranes before and after photo-regeneration.

The membranes exhibited varied trends towards removal of the different pharmaceuticals tested. Therefore, the total masses of acetaminophen (not shown), ibuprofen, and carbamazepine, removed by MWNTs-only membranes, MWNT-TiO$_2$ membranes during the 1$^{st}$ run, and MWNT-TiO$_2$ after photo-regeneration were calculated to better understand this phenomenon. FIG. 7 shows mass loading of membranes upon complete saturation with pharmaceuticals. The results exhibit a superiority of the MWNT-TiO$_2$ membrane over the MWNTs-only membrane for the removal capacity of selected pharmaceuticals. For each gram of MWNTs, a total of 2.9, 6.7, and 4.8 mg of acetaminophen, ibuprofen, and carbamazepine were removed by MWNT membranes, respectively, with the order correlating with the log K$_{ow}$ values of the pharmaceuticals tested. This removal increased to 4.13, 22.1, and 17.2 mg in the case of the MWNT-TiO$_2$ membrane for the first run and ultimately decreased to 0.78, 12.4, and 8.4 mg for the MWNT-TiO$_2$ membrane after photo-regeneration. This removal, which may not necessarily be due solely to sorption, is comparable to reported data of acetaminophen, ibuprofen, and carbamazepine adsorption by carbonaceous materials. In contrast, the MWNTs-only and MWNT-TiO$_2$ membranes, developed and applied in this work, could be easily recovered and regenerated from the water system. This higher adsorption removal of ibuprofen on MWNTs-only and MWNT-TiO$_2$ membranes paved the way to further investigate the effect of pH on its adsorption. In addition, the difference in removal between first-time sorption (or the 1st run) and post-regeneration sorption for all three sorbates warrants further study, specifically to optimize the efficacy of the photo-regeneration parameters such as regeneration wavelength and exposure time. Quantum yields of anatase TiO$_2$ from irradiation with long-wave UV have been reported to be higher than those obtained at 254 nm[45].

Example 5

Effect of pH on Adsorption of Ibuprofen on the MWNT Membrane

The effect of pH on the adsorption of ibuprofen by MWNT membranes was investigated at pH 4, 7 and 11. The pK$_a$ of ibuprofen is reported to be 4.9[3]. As shown in FIG. 8(a), pH played a significant role in the adsorption of ibuprofen onto the membranes. The surface charge density of carbon nanotubes was negative as shown in FIG. 3(a) and reported elsewhere. Therefore, their isoelectric point should exist below pH 7. In fact, it is reported in the literature to be even below pH 4.0. Therefore, the surface charge of the MWNT membrane was essentially negative throughout the course of this work i.e., from pH 4 to 11. The decrease in pH of solution led to the decrease in surface charge density of carbon nanotubes through the transition from —COO$^-$ groups to —COOH groups located at broken edges and sidewall defects of MWNTs. In contrast, the ibuprofen molecule was more protonated at pH below 4.9 and existed as a carboxylate ion at pH 7 and 11.

Based on the observations listed above, it can be proposed that at pH 7 and pH 11 the surface of MWNTs and ibuprofen molecules were negatively charged and underwent electrostatic repulsion which resulted in minimal adsorption of ibuprofen on the MWNT membranes. Upon decreasing the pH of ibuprofen solution below its pK$_a$ (i.e. at pH 4), a significant quantity of ibuprofen adsorbed on the MWNT membrane (FIG. 8a). The MWNTs-only membrane stabilized after the passage of 40 mL ibuprofen solution and continuously adsorbed over 25% of influent ibuprofen (8.64 mg/L) from (at least) another 25 mL of ibuprofen solution. This adsorption removal at pH 4 was significantly higher than adsorption at pH 7 and pH 11 (FIG. 8a) and at pH (5.5) of deionized water (FIG. 6b) at ambient conditions. A preliminary adsorption mechanism of ibuprofen on MWNTs at pH 4 is proposed in FIG. 8b. It can be inferred from reported literature and FIG. 3a that the MWNTs were negatively charged at pH 4, therefore, only the protonation of ibuprofen was responsible for electrostatic attraction between neutral ibuprofen and negatively charged MWNTs. Ultimately, the negatively charged MWNTs adhered to protonated ibuprofen at pH 4 which was below the pK$_a$ (4.9) of ibuprofen, resulting in increased adsorption of ibuprofen on the MWNT membrane at pH 4 compared to pH 7 and pH 11.

The effect of pH on adsorption of ibuprofen was tested by employing aqueous ibuprofen solutions with three different pH values in FIG. 8(a); pH 4 (♦), pH 7 (□), and pH 11 (▲). One solution was below (pH 4.0) and two were above (pH 7.0 and pH 11.0) the pK$_a$ of ibuprofen (pK$_a$=4.9). The conductivity was kept constant at 500 μS/cm and adjusted with monovalent salt (NaCl). The pH was adjusted using HCl and NaOH in the presence of 1 mM potassium phosphate buffer. The pKa of ibuprofen is 4.9. The influent concentration of ibuprofen was 8.46 mg/L, NaCl conductivity was 500 μS/cm, and pH was adjusted using HCl and NaOH with 1 mM phosphate buffer.

In FIG. 8(b), the proposed mechanism of adsorption of ibuprofen on MWNTs. Deprotonated ibuprofen molecule was protonated at pH 4 below pKa (4.9) of ibuprofen. Electrostatic interactions between ibuprofen and negatively charged MWNTs may have been responsible for attachment.

The foregoing is illustrative of the present invention, and is not to be construed as limiting thereof. The invention is defined by the following claims, with equivalents of the claims to be included therein.

What is claimed is:

1. A process for making a filter comprising carbon nanotubes, wherein said carbon nanotubes comprise high surface area, titanium dioxide nanospheres dispersed therein, comprising:
   (a) providing a vacuum filtration apparatus and placing a porous substrate into said vacuum filtration apparatus;
   (b) adding a composition comprising carbon nanotubes and, a surfactant;
   (c) applying negative pressure to draw said composition through said porous substrate, thereby adsorbing said carbon nanotubes onto said porous substrate;
   (d) washing said porous substrate with a solvent;
   (e) adding a suspension comprising high surface area titanium dioxide nanospheres having dendrite or needle-like structures; and
   (f) applying negative pressure to draw said titanium dioxide suspension through said porous substrate comprising said carbon nanotubes,
   to thereby adsorb the titanium dioxide onto said carbon nanotubes, to make said filter.

2. The process of claim 1, further comprising:
   (g) repeating steps (b) through (f) of the process to a membrane thickness of 10 to 50 μm thick and with a permeate flux from 10 to 50 L/m²h.

3. The process of claim 2, further comprising:
   (h) washing said composition with a solvent until the conductivity of the solvent passed through said composition is less than about 1 μS/cm.

4. The process of claim 1, wherein said porous substrate comprises single or multi-component polymers comprising acrylics, co-polyesters, nylons, polycarbonates, polyesters, polyimides, polyolefins such as polyethylene, polypropylene, halogenated polymers such as polyvinylchloride (PVC), polytetrafluoroethylene (Teflon) and polyvinylidene difluoride (PVDF), polyarylsulfones, polyethersulfones, polyphenylsulfones, polysulfones, polyvinyl alcohols, celluloses, mixed esters of cellulose (MEC), polystyrenes, polyurethanes, surface modified polyethersulfone (PES), PFA, or rubbers selected from the group consisting of silicone, natural, synthetic and vulcanized.

5. The process of claim 1, wherein said carbon nanotubes are multi-walled carbon nanotubes.

6. The process of claim 1, wherein said high surface area titanium dioxide nanospheres are produced by a method comprising:
   a) providing a suspension comprising titanium dioxide, anatase, in an aqueous base;
   b) autoclaving the suspension for a time of from 6 to 30 hours, at a temperature of from 80° C. to 160° C., to provide an autoclaved titanium dioxide;
   c) separating the autoclaved titanium dioxide from the aqueous base;
   d) adding to the autoclaved titanium dioxide an aqueous acid to form a second suspension having an aqueous layer;
   e) decanting the aqueous layer and measuring the pH of the aqueous layer; and
   f) repeating steps d) and e) until the aqueous layer has a pH of about 6.5 to about 7.5,
   thereby producing said high surface area titanium dioxide nanospheres having dendrite or needle-like structures.

7. The process of claim 6, further comprising:
   g) washing the high surface area titanium dioxide nanospheres with a suitable solvent until the conductivity value is less than about 1 μS/cm.

8. The process of claim 6, wherein the high surface area titanium dioxide nanospheres have an average diameter of from 50 to 1000 nanometers.

9. A photoregenerable filter comprising:
   (a) a porous polymeric substrate layer;
   (b) a porous layer of carbon nanotubes adsorbed onto the surface of said porous substrate layer; and
   (c) high-surface-area titanium dioxide nanospheres embedded at the surface of said porous carbon nanotube layer, wherein the titanium dioxide nanospheres have dendrite or needle-like structures.

10. The filter of claim 9, wherein said porous substrate comprises single or multi-component polymers comprising acrylics, co-polyesters, nylons, polycarbonates, polyesters, polyimides, polyolefins such as polyethylene, polypropylene, halogenated polymers such as polyvinylchloride (PVC), polytetrafluoroethylene (Teflon) and polyvinylidene difluoride (PVDF), polyarylsulfones, polyethersulfones, polyphenylsulfones, polysulfones, polyvinyl alcohols, celluloses, mixed esters of cellulose (MEC), polystyrenes, polyurethanes, surface modified polyethersulfone (PES), PFA, or rubbers selected from the group consisting of silicone, natural, synthetic and vulcanized.

11. The filter of claim 9, wherein the porous substrate has an average pore size of about 100 to about 300 nm.

12. A method for removing a substance from water, comprising:
   providing the filter of claim 9;
   passing a composition comprising said substance in said water through said filter, wherein said water is in fluid contact with said carbon nanotubes comprise high surface area titanium dioxide nanospheres dispersed therein;
   whereby said substance is adsorbed onto said carbon nanotubes of said filter;
   to thereby remove said substance from said water.

13. The method of claim 12, wherein said filter is photoregenerable.

14. The method of claim 13, wherein the filter is photoregenerable by titanium dioxide nanospheres on said carbon nanotubes of said filter.

15. A method for photo-regenerating a filter of claim 9 comprising a substance adsorbed onto said carbon nanotubes of said filter, comprising:
   (a) hydrating or solvating said filter in a solvent; and
   (b) applying ultraviolet light to said filter for about 1 to about 8 hours, to thereby regenerate said filter, whereupon the filter can be reused for further sorption.

16. The method of claim 12, wherein the substance is a polycyclic aromatic hydrocarbon, polychlorinated biphenyl (PCB), phthalate, surfactant, dioxin, furan, organic compound originating from food and household related product, plasticizer, flame retardant, preservative, antioxidant, chlorinated and non-chlorinated solvent, fragrance, insecticide, pesticide, fungicide, herbicide, pharmaceutical, organic pollutant from road or vehicle pollution, dye, or an iodinated X-ray contrast substance.

17. The method of claim 12, wherein the substance is carbamazepine ibuprofen, or a metabolite thereof.

\* \* \* \* \*

UNITED STATES PATENT AND TRADEMARK OFFICE
CERTIFICATE OF CORRECTION

| | | |
|---|---|---|
| PATENT NO. | : 9,840,425 B2 | |
| APPLICATION NO. | : 14/609696 | |
| DATED | : December 12, 2017 | |
| INVENTOR(S) | : Ahmad et al. | |

It is certified that error appears in the above-identified patent and that said Letters Patent is hereby corrected as shown below:

In the Specification

Column 8, Line 45:
Replace "300 mu" with -- 300 nm --

Column 16, Line 26:
Replace "U.S. Pat. No. 1,335,508)" with -- U.S. Pat. No. (1,335,508) --

Signed and Sealed this
Tenth Day of July, 2018

Andrei Iancu
*Director of the United States Patent and Trademark Office*